United States Patent
Elad et al.

(10) Patent No.: US 11,272,516 B2
(45) Date of Patent: Mar. 8, 2022

(54) METHODS AND APPARATUS TO MITIGATE COEXISTENCE INTERFERENCE IN A WIRELESS NETWORK

(71) Applicant: Intel IP Corporation, Santa Clara, CA (US)

(72) Inventors: Yuval Elad, Petach-Tikva (IL); Daniel F. Bravo, Portland, OR (US); Shimon Solodkin, Beer Sheva (IL)

(73) Assignee: INTEL CORPORATION, Santa Clara, CA (US)

( * ) Notice: Subject to any disclaimer, the term of this patent is extended or adjusted under 35 U.S.C. 154(b) by 132 days.

(21) Appl. No.: 16/651,971

(22) PCT Filed: Dec. 18, 2017

(86) PCT No.: PCT/US2017/067043
§ 371 (c)(1),
(2) Date: Mar. 27, 2020

(87) PCT Pub. No.: WO2019/125374
PCT Pub. Date: Jun. 27, 2019

(65) Prior Publication Data
US 2020/0260462 A1   Aug. 13, 2020

(51) Int. Cl.
*H04W 72/08*   (2009.01)
*H04W 52/02*   (2009.01)
(Continued)

(52) U.S. Cl.
CPC ..... *H04W 72/082* (2013.01); *H04W 52/0238* (2013.01); *H04W 52/143* (2013.01); *H04W 52/367* (2013.01); *H04W 72/0473* (2013.01)

(58) Field of Classification Search
CPC ........... H04W 72/082; H04W 72/0473; H04W 52/0238; H04W 52/143; H04W 52/367; H04W 52/146; H04W 24/02
See application file for complete search history.

(56) References Cited

U.S. PATENT DOCUMENTS

| 10,736,055 B2* | 8/2020 | Rahman | H04W 52/16 |
| 2005/0195910 A1* | 9/2005 | Kim | H04L 27/2608 375/260 |

(Continued)

FOREIGN PATENT DOCUMENTS

| WO | 2017024441 | 2/2017 |
| WO | 2017044696 | 3/2017 |

OTHER PUBLICATIONS

International Searching Authority, "International Search Report and Written Opinion", issued in connection with application No. PCT/US2017/067043 dated Nov. 12, 2018, 10 pages.

(Continued)

*Primary Examiner* — Habte Mered
(74) *Attorney, Agent, or Firm* — Hanley, Flight & Zimmerman, LLC

(57) ABSTRACT

Methods and apparatus to mitigate coexistence interference in a wireless network are disclosed. An example apparatus includes a station component interface to receive an expected transmission power from an access point; an index processor to determine a set of preferred resource unit (RU) indexes from a set of available RU indexes for at least one of (A) uplink transmission to the access point based on a comparison of allowable transmission power and the expected transmission power or (B) downlink reception based on a comparison of a noise floor to a noise threshold; and the station component interface to transmit a message including the preferred RU indexes to the access point.

24 Claims, 12 Drawing Sheets

(51) Int. Cl.
H04W 52/14 (2009.01)
H04W 52/36 (2009.01)
H04W 72/04 (2009.01)

(56) References Cited

U.S. PATENT DOCUMENTS

| | | | |
|---|---|---|---|
| 2005/0201476 A1* | 9/2005 | Kim | H04L 5/0044 375/260 |
| 2010/0246538 A1* | 9/2010 | Kravtsov | H04W 72/06 370/336 |
| 2012/0093011 A1* | 4/2012 | Ranta-Aho | H04L 5/0042 370/252 |
| 2012/0176923 A1* | 7/2012 | Hsu | H04W 52/243 370/252 |
| 2012/0201211 A1* | 8/2012 | Wong | H04L 1/0028 370/329 |
| 2013/0272231 A1* | 10/2013 | Dinan | H04B 7/2618 370/329 |
| 2014/0133415 A1* | 5/2014 | Damnjanovic | H04W 52/30 370/329 |
| 2016/0242128 A1* | 8/2016 | Loehr | H04W 52/346 |
| 2021/0136694 A1* | 5/2021 | Gao | H04W 52/08 |

OTHER PUBLICATIONS

Robert, Stacey, "Specification Framework for TGax", TGac Spec Framework, May 25, 2016, 61 pages.

International Searching Authority, "International Preliminary Report on Patentability", issued in connection with application No. PCT/US2017/067043 dated Jun. 23, 2020, 7 pages.

Intellectual Property of India, "Examination Report," issued in connection with Application No. 202047010843, dated Aug. 17, 2021, 7 pages.

* cited by examiner

METHODS AND APPARATUS TO MITIGATE COEXISTENCE INTERFERENCE IN A WIRELESS NETWORK

RELATED APPLICATIONS

This patent from a continuation of PCT International Application Serial No. PCT/US17/67043, which was filed on Dec. 18, 2017. PCT International Application Serial No. PCT/US17/67043 is hereby incorporated herein by reference in its entirety. Priority to PCT International Application Serial No. PCT/US17/67043 is hereby claimed.

FIELD OF THE DISCLOSURE

This disclosure relates generally to wireless fidelity connectivity (Wi-Fi) and, more particularly, to methods and apparatus to mitigate coexistence interference in a wireless network.

BACKGROUND

Many locations provide Wi-Fi to connect Wi-Fi enabled devices to networks such as the Internet. Wi-Fi enabled devices include personal computers, video-game consoles, mobile phones and devices, digital cameras, tablets, smart televisions, digital audio players, etc. Wi-Fi allows the Wi-Fi enabled devices to wirelessly access the Internet via a wireless local area network (WLAN). To provide Wi-Fi connectivity to a device, a Wi-Fi access point transmits a radio frequency Wi-Fi signal to the Wi-Fi enabled device within the access point (e.g., a hotspot) signal range. Wi-Fi is implemented using a set of media access control (MAC) and physical layer (PHY) specifications (e.g., such as the Institute of Electrical and Electronics Engineers (IEEE) 802.11 protocol).

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
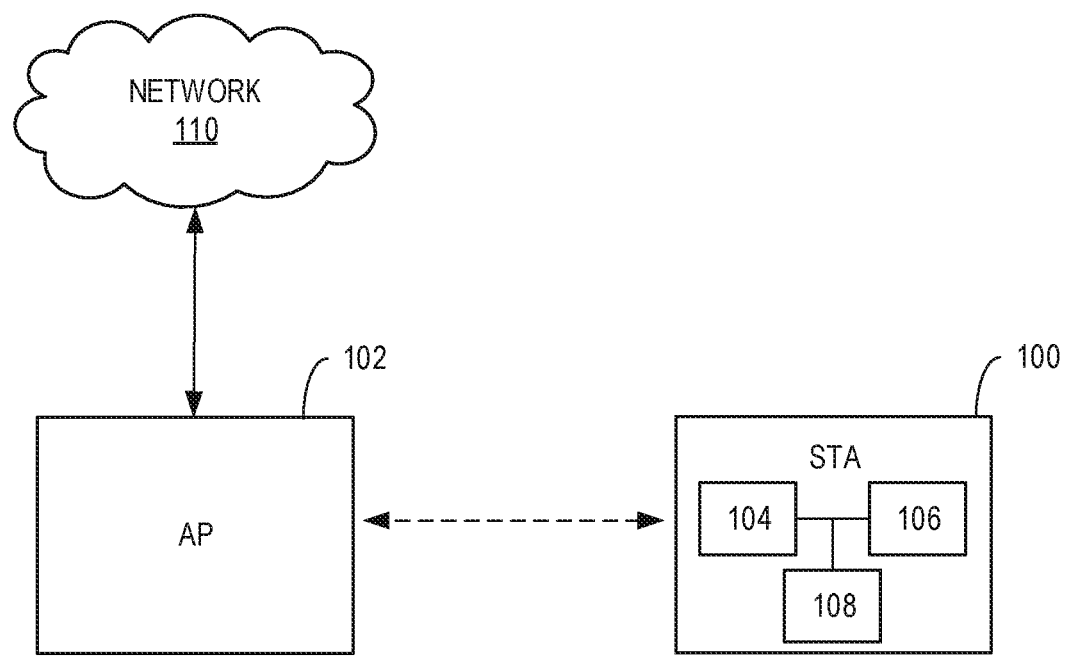
FIG. 1 is an illustration of an example station used herein to mitigate coexistence interference in a wireless network.

Various locations (e.g., homes, offices, coffee shops, restaurants, parks, airports, etc.) may provide Wi-Fi to Wi-Fi enabled devices (e.g., stations (STA)) to connect the Wi-Fi enabled devices to the Internet, or any other network, with minimal hassle. The locations may provide one or more Wi-Fi access points (APs) to output Wi-Fi signals to the Wi-Fi enabled device within a transmission range of the Wi-Fi signals (e.g., a hotspot). A Wi-Fi AP is structured to wirelessly connect a Wi-Fi enabled device to the Internet through a wireless local area network (WLAN) using Wi-Fi protocols (e.g., such as IEEE 802.11). The Wi-Fi protocol is the protocol by which the AP communicates with the STAs to provide access to the Internet by transmitting uplink (UL) transmission data and receiving downlink (DL) transmission data to/from the Internet.

Some Wi-Fi protocols (e.g., 802.11ax) enable an AP to schedule DL and UL transmissions between one or more connected STAs. The AP may aggregate data from the multiple STAs while leveraging orthogonal frequency-division multiple access (OFDMA) for frequency allocation among the STAs. The AP facilitates the OFDMA bandwidth between the multiple STAs (e.g., for transmitting and/or receiving) using a Resource Unit (RU) allocation scheme, where a STA communicates using one or more RU index(es) (e.g., subchannels of the allocated Wi-Fi frequency band) as defined by the AP. For example, for STAs participating in a 40 Megahertz (MHz) OFDMA transmission, the RU indexes each include 26 tones with a bandwidth of 2 MHz. Accordingly, the AP may schedule a first STA for communication (e.g., uplink reception (UL RX) from the first STA) using a first set of RU indexes and may schedule a second STA for communication (e.g., uplink transmission (UL TX) from the second STA) at the same time using a second set of RU indexes. Alternatively, other types of OFDMA transmissions may also be divided into an RU allocation scheme (e.g., 20 MHz, 80 MHz, 160 MHz, etc.)

Some STAs include an asynchronous transfer mode (ATM) modem (e.g., a 2 generation (2G) ATM, a third generation (3G) ATM, a fourth generation (4G) ATM, a long-term evolution (LTE) ATM, etc.) for ATM-based communications. For example, a mobile phone, tablet, laptop, etc. may include a Wi-Fi modem (e.g., Wi-Fi based radio architecture) and an ATM modem (e.g., ATM-based radio architecture). For example, the Wi-Fi modem may facilitate communications within the 2.4 Gigahertz (GHz) industrial, scientific, and medical (ISM) band (e.g., 2.4 GHz-2.4835 GHz) while an LTE ATM modem may facilitate communications in LTE Bands 7, 40, and/or 41 (e.g., 2.5 GHz-2.57 GHz, 2.3 GHz-2.4 GHz, and/or 2.496 GHz-2.690 GHz, respectively). Because the bands used by the ATM modem and the bands used by the Wi-Fi modem are so close together in frequency, active use of the ATM modem at the same time as the Wi-Fi modem may cause coexistence interference to the transmission/reception of either modem. Some conventional techniques for mitigating WLAN-ATM coexistence interference in 802.11ax rely on filtering solutions, time division techniques, and TX power reduction techniques. However, such techniques are expensive. Some conventional techniques for mitigating WLAN-ATM coexistence inference in wireless protocols (e.g., prior to 802.11 ax) include reporting interference (e.g., central frequency and bandwidth) that block/de-sense the RX of the STA. However, such techniques do not include transmitting hardware capabilities of the STA or temporal link conditions and link demands. Additionally, such conventional techniques do not solve the problem of STA transmissions that may block/de-sense the RX of an adjacent radio.

Examples disclosed herein mitigate coexistence interference between ATM communications and Wi-Fi communications in a wireless network to optimize overall throughput of both ATM traffic and WLAN traffic when they are active concurrently. Examples disclosed herein provide an adaptive frequency allocation scheme within the OFDMA associated bandwidth range to mitigate Wi-Fi/LTE interferences in the frequency domain. Examples disclosed herein include STAs that determine preferred RUs to be allocated for Wi-Fi transmissions that will not be interfered by/interfere with ATM communications. The STAs transmit the preferred RUs in a message (e.g., a resource allocation preference request (RAPR)) to an AP for communication scheduling based on the preferred RUs. In some examples, if a STA's ATM modem is currently active, the STA can determine that the RUs nearest the frequencies used by the ATM modem include a higher noise floor than the RUs furthest from the frequencies used by the ATM modem. In such an example, the STA may select the RUs furthest from the frequencies used by the ATM as preferred RUs to be used for receiving DL packets from an AP (e.g., DL RX). In some examples, the STA selects the preferred RUs for DL RX based on a comparison of the noise floor power caused by the ATM modem and a minimal RSSI threshold. In some examples, if a STA's ATM modem is currently active, the STA can determine that the maximum TX power of a Wi-Fi antenna needs to be reduced for RUs nearest the frequencies used by the ATM modem to prevent TX interference on the ATM's communications (e.g., to allow for Wi-Fi/ATM coexistence). In such an example, the STA may select the RUs furthest from the frequencies used by the ATM as preferred RUs to be used for transmitting TX packets to an AP (e.g., UL TX). In some examples, the STA selects the preferred RUs for UL TX based on a comparison of the maximum TX power for coexistence and a minimal TX power requirement from the AP.

The example STA includes the preferred RUs for UL and DL transmissions in the RAPR to be sent to the AP for OFDMA scheduling. Additionally, a STA may include bandwidth (BW) priority bits in the RAPR to identify whether OFDMA scheduling of UL and/or DL transmissions using the BW corresponding to the preferred RUs is (A) mandatory or (B) optional (e.g., preferable but not necessarily required). In this manner, the AP can optimize the OFDMA scheduling based on the BW priority. The STA may determine the UL or DL BW priority based on current bandwidth demands, strength of current interference, etc. In some examples the STA can define separate RU preferences for UL and DL transmissions based on the type of interference (e.g., frequency division duplexing (FDD) uplink only or time division duplexing (TDD)).

In some examples, when a STA only has partial information on interference characteristics and/or platform characteristics available to the STA (e.g., when the STA has knowledge of an active interfering radio adjacent to it, but does not have a calculated allowed TX power per RU or when an interfering radio is no co-located with the Wi-Fi device in the STA), examples disclosed herein perform a heuristic algorithm for determining the preferred RUs. Such examples include selecting a RU for DL/UL that is assumed to be safe (e.g., not likely to interfere or be interfered with). In such examples, the STA determines the protocol data unit (PDU) success rate corresponding to the selected RU. If the PDU success rate is above a rate threshold, the range of preferred RUs is expanded and the process continues until an optimal preferred RU BW is determined (e.g., the maximum BW is achieved that satisfies the rate threshold). If the PDU success rate is below the rate threshold (e.g., or a second rate threshold), the range of the preferred RUs is decreased and/or the selected RU is changed and the process continues until the preferred RU BW is determined.

FIG. 1 illustrates an example STA 100 to mitigate Wi-Fi/ATM coexistence interference in a wireless network. FIG. 1 includes the example STA 100, an example AP 102, an example Wi-Fi radio architecture 104, an example ATM modem 106, an example resource allocation preference determiner 108, and an example network 110. Although the example of FIG. 1 includes one STA 100, the example AP 102 may communicate with any number of STAs.

The example STA 100 of FIG. 1 is a Wi-Fi and/or ATM enabled computing device. The example STA 100 may be, for example, a computing device, a portable device, a mobile device, a mobile telephone, a smart phone, a tablet, a gaming system, a digital camera, a digital video recorder, a television, a set top box, an e-book reader, and/or any other Wi-Fi and/or ATM enabled device. The example STA 100 communicates with the example AP 102 to access the example network 110 (e.g., the Internet). The STA 100 includes the example Wi-Fi radio architecture 104, the example ATM modem 106, and/or the example resource allocation preference determiner 108, as further described below.

The example AP 102 of FIG. 1 is a device that allow the example STA 100 to access the example network 110 (e.g., the Internet). The example AP 102 may be a router, a modem-router, a receiver, and/or any other devices that provide a wireless connection to the example network 110. In one example, the AP 102 may be a router that provides a wireless communication link to the example STA 100 using a predetermined frequency band (e.g., 2.4 GHz, 5 GHz, and/or any other frequency band). A modem-router combines the functionalities of the modem and the router. The AP 102 accesses the network 110 through a wire connection via a modem. In some examples the AP 102 facilitates Wi-Fi communications and/or ATM communications for the example STA 100 to the example network 110. In some examples, there may be two APs, a first AP to facilitate Wi-Fi communications and a second AP (e.g., an ATM antenna or tower) to facilitate ATM communications.

The example radio architecture 104 of FIG. 1 corresponds to the components of the example STA 100 capable of communicating using a Wi-Fi protocol and the example ATM modem 106 of FIG. 1 corresponds to the components of the example STA 100 capable of communication using an ATM (e.g., LTE) protocol. The example radio architecture 104 is further described below in conjunction with FIG. 8.

The example resource allocation preference determiner 108 of FIG. 1 mitigates Wi-Fi/ATM coexistence interference by transmitting a message (e.g., a RAPR) corresponding to preferred RU indexes for DL RX and/or UL TX. In this manner, the example AP 102 can determine how to allocate the OFDMA bandwidth based on the RU index preferences of the STA 100 and other connected STAs. The example resource allocation preference determiner 108 determines the preferred RU indexes for DL RX based on a comparison of a noise floor of each RU index and a RSSI threshold. The example resource allocation preference determiner 108 determines the preferred RU indexes for UL TX based on a comparison of (A) the maximum allowable transmission power that may be utilized without causing substantial interference on the transmission of the ATM modem 106 (e.g., when active) and (B) the minimum desired TX power (e.g., sent by the example AP 102). The example resource allocation preference determiner 108 may update the RAPR based on STA changes (e.g., BW requirement changes, ATM transmission changes, location changes, data success rate changes, etc.) to expand or reduce a range of preferred RU indexes. In some examples, the resource allocation preference determiner 108 indicates a preferred RU BW priority corresponding to whether utilization of the preferred RU index range is mandatory or optional (e.g., preferred). When the preferred RU index range is optional, the example AP 102 may schedule the example STA 100 at RU indexes outside the preferred range when necessary.

The example network 110 of FIG. 1 is a system of interconnected systems exchanging data. The example network 110 may be implemented using any type of public or private network such as, but not limited to, the Internet, a telephone network, a local area network (LAN), a cable network, and/or a wireless network. To enable communication via the network 110, the example AP 102 includes one or more communication interface(s) that enables a connection to an Ethernet, a digital subscriber line (DSL), a telephone line, a coaxial cable, or any wireless connection, etc.

Figure 2:
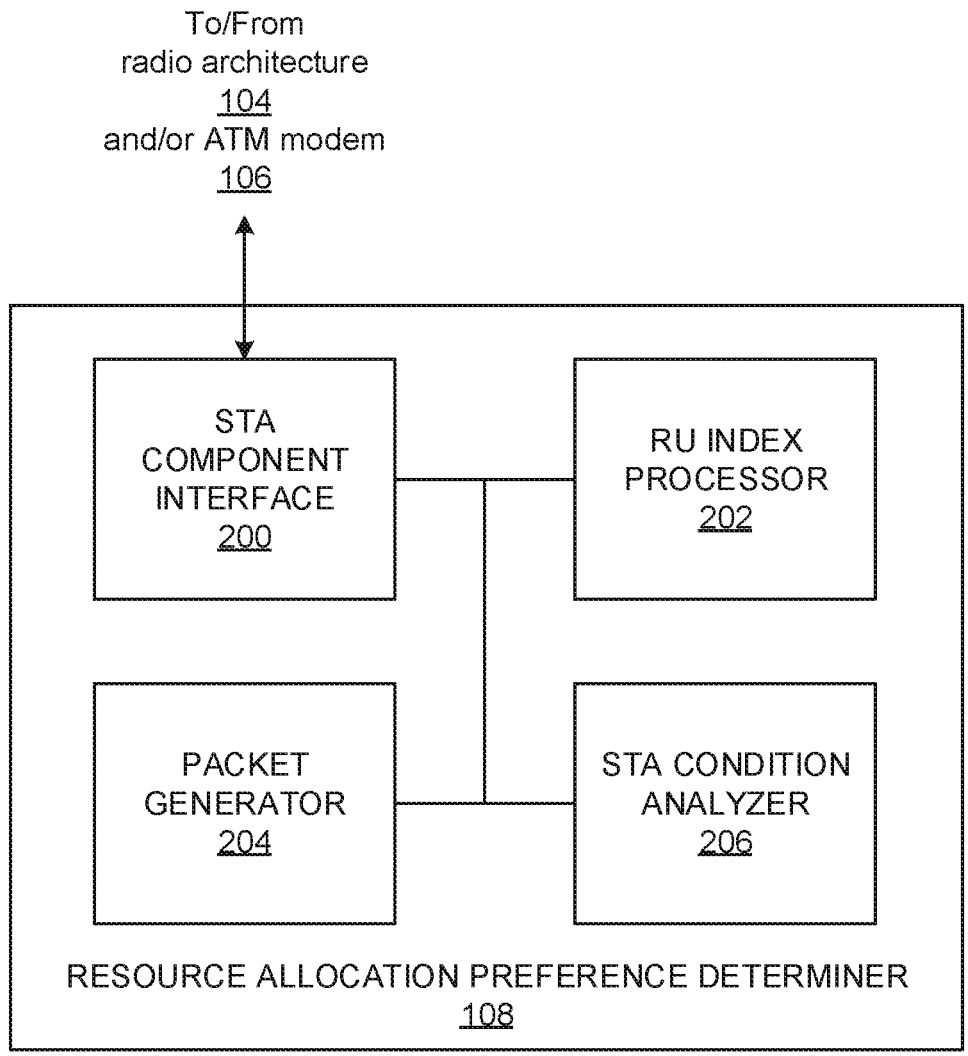
FIG. 2 is a block diagram of an example resource allocation preference determiner of the example station of FIG. 1.

FIG. 2 is a block diagram of the example resource allocation preference determiner 108 of FIG. 1. The example resource allocation preference determiner 108 includes an example STA component interface 200, an example RU index processor 202, an example packet generator 204, and an example STA (station) condition analyzer 206.

The example STA component interface 200 of FIG. 2 interfaces with components of the example STA 100 (e.g., the example Wi-Fi radio architecture 104 and/or the example ATM modem 106 of FIG. 1) to transmit signals (e.g., including RAPR messages), receive signals (e.g., control signals identifying expected TX power), and/or gather status information from the components of the STA 100. For example, the STA component interface 200 may interface with the example ATM modem 106 and/or radio architecture 104 to gather data corresponding to a maximum allowed TX power for coexistence using one or more RUs, a noise floor for one or more RUs, etc.

The example RU index processor 202 of FIG. 2 determines the preferred RUs for UL TX and/or DL RX. The example RU index processor 202 determines the preferred RUs for UL TX by comparing the allowable TX power level for each RU index to the expected TX power (e.g., from the AP 102). The allowable TX power level corresponds to a maximum TX power level that can be used by a transmitter (e.g., the example antenna 801 of FIG. 8) to transmit a DL data packet without causing interference (e.g., more than a threshold amount of interference) on the ATM (e.g., LTE) transmission. The example RU index processor 202 determines the preferred RUs for DL RX by comparing the noise floor of each RU index to a minimal RSSI level. The expected noise floor corresponds to the in-device interference cause by ATM transmissions and the minimal RSSI level corresponds to an amount of noise that would cause sufficient interference to affect the reception of a DL packet by the radio architecture 104. In some examples, the RU index processor 202 determines the UL/DL priority based on the bandwidth demands, strength of current interference, etc. As described above, the UL/DL priority corresponds to whether the preferred RU units are optional or mandatory when scheduling OFDMA for the STA 100. In some examples, the RU index processor 202 may expand or adjust the preferred RU values based on changes in the network, changes in the ATM use of the STA 100, and/or performance of a heuristic algorithm (e.g., when only partial information on interference characteristics and/or platform characteristics are known).

The example packet generator 204 of FIG. 2 generates a RAPR packet to be transmitted to the AP 102 identifying the preferred RUs for UL TX and/or DL RX of the STA 100 based on the processing by the example RU index processor 202. In some example, the example RAPR may include a UL minimal index (e.g., the minimum 2 MHz RU index that should be considered for allocation for the STA 100 for UL TX), a UL maximal index (e.g., the maximum 2 MHz RU index that should be considered for allocation for the STA for UL TX), a DL minimal index (e.g., the minimum 2 MHz RU index that should be considered for allocation for the STA 100 for DL RX), a DL maximal index (e.g., the maximum 2 MHz RU index that should be considered for allocation for the STA for DL RX), an UL BW priority (e.g., a bit value that corresponds to whether RUs outside of the min/max UL indexes (A) may never be allocated for the STA 100 or (B) may be used if the preferred range cannot be fulfilled), and a DL BW priority (e.g., a bit value that corresponds to whether RUs outside of the min/max DL indexes (A) may never be allocated for the STA 100 or (B) may be used if the preferred range cannot be fulfilled). In some examples, the min/max UL/DL indexes may be replaced with a list of preferred UL/DL indexes.

The example STA condition analyzer 206 of FIG. 2 analyzes the STA conditions based on the information received from the example STA component interface 200. In some examples, the STA conditional analyzer 206 determines the allowable transmitter power level of each RU index based on the characteristics of the radio architecture 104 and/or the example ATM modem 106. For example, the example STA condition analyzer 206 obtains (A) an allowed de-sense level for an active ATM (e.g., LTE) RX channel and (B) out-of-band emission characteristics of a transmitter of the radio architecture 104 and the guaranteed isolation between the LTE receiver antenna and the Wi-Fi transmitter antenna to calculate the Wi-Fi TX power that would satisfy the de-sense requirement. Additionally, the example STA condition analyzer 206 may determine that the bandwidth corresponding to the preferred RUs needs to be expanded based on a determination that the queue of UL data packets is too long in a buffer (e.g., corresponding to the memory 1214, 1213, and/or 1216 of FIG. 12) of the radio architecture 104. In such examples, the preferred RUs for UL TX may be expanded and/or the priority bit for UL TX may be adjusted to expand the BW beyond the preferred RUs. In some examples, the STA conditional analyzer 206 calculates the expected noise floor for an RU that will be resulted due to ATM transmission. The examples STA conditional analyzer 206 may calculate the expected noise floor based on noise sources and unwanted signals in the STA 100. Additionally, the example STA conditional analyzer 206 may determine a PDU success rate based on a ratio of data packets received at the radio architecture 104.

Figure 8:
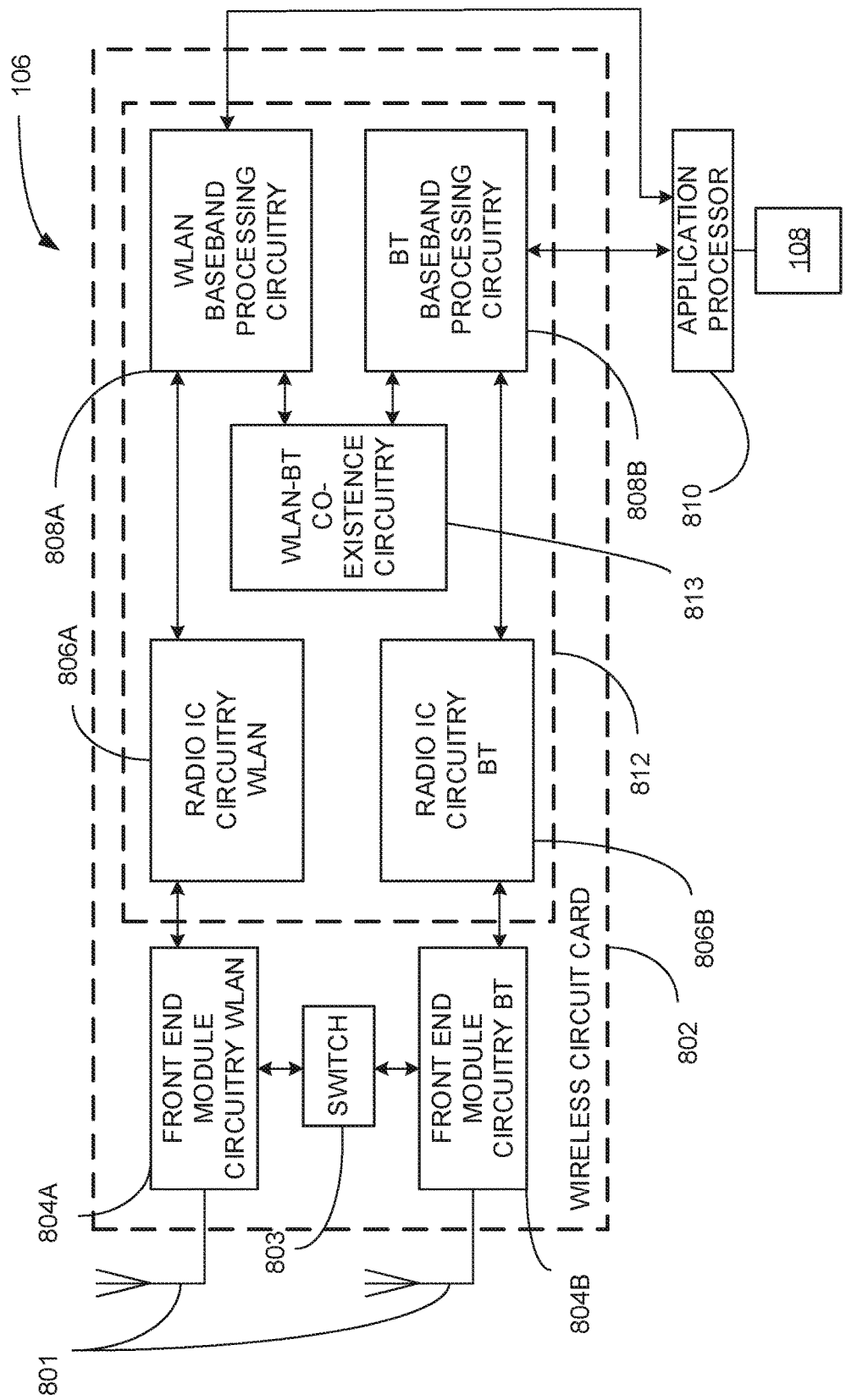
FIG. 8 is a block diagram of a radio architecture in accordance with some examples.

While an example manner of implementing the example resource allocation preference determiner 108 of FIG. 1 is illustrated in FIG. 2, one or more of the elements, processes and/or devices illustrated in FIG. 2 may be combined, divided, re-arranged, omitted, eliminated and/or implemented in any other way. Further, the example STA component interface 200, the example RU index processor 202, the example packet generator 204, the example STA condition analyzer 206, and/or, more generally, the example resource allocation preference determiner 108 of FIG. 2 and/or the example application processor 810 of FIG. 8 may be implemented by hardware, software, firmware and/or any combination of hardware, software and/or firmware. Thus, for example, any of the example STA component interface 200, the example RU index processor 202, the example packet generator 204, the example STA condition analyzer 206, and/or, more generally, the example resource allocation preference determiner 108 of FIG. 2 and/or the example application processor 810 of FIG. 8 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example STA component interface 200, the example RU index processor 202, the example packet generator 204, the example STA condition analyzer 206, and/or, more generally, the example resource allocation preference determiner 108 of FIG. 2 and/or the example application processor 810 of FIG. 8 is/are hereby expressly defined to include a non-transitory computer readable storage device or storage disk such as a memory, a digital versatile disk (DVD), a compact disk (CD), a Blu-ray disk, etc. including the software and/or firmware. Further still the example STA component interface 200, the example RU index processor 202, the example packet generator 204, the example STA condition analyzer 206, and/or, more generally, the example resource allocation preference determiner 108 of FIG. 2 and/or the example application processor 810 of FIG. 8 may include one or more elements, processes and/or devices in addition to, or instead of, those illustrated in FIG. 2, and/or may include more than one of any or all of the illustrated elements, processes and devices.

Flowcharts representative of example machine readable instructions for implementing the example resource allocation preference determiner 108 of FIG. 2 are shown in FIGS. 3-6. In this example, the machine readable instructions comprise a program for execution by a processor such as the processor 1212 shown in the example processor platform 1200 discussed below in connection with FIG. 12. The program may be embodied in software stored on a non-transitory computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIGS. 3-6, many other methods of implementing the example resource allocation preference determiner 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 3-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 3:
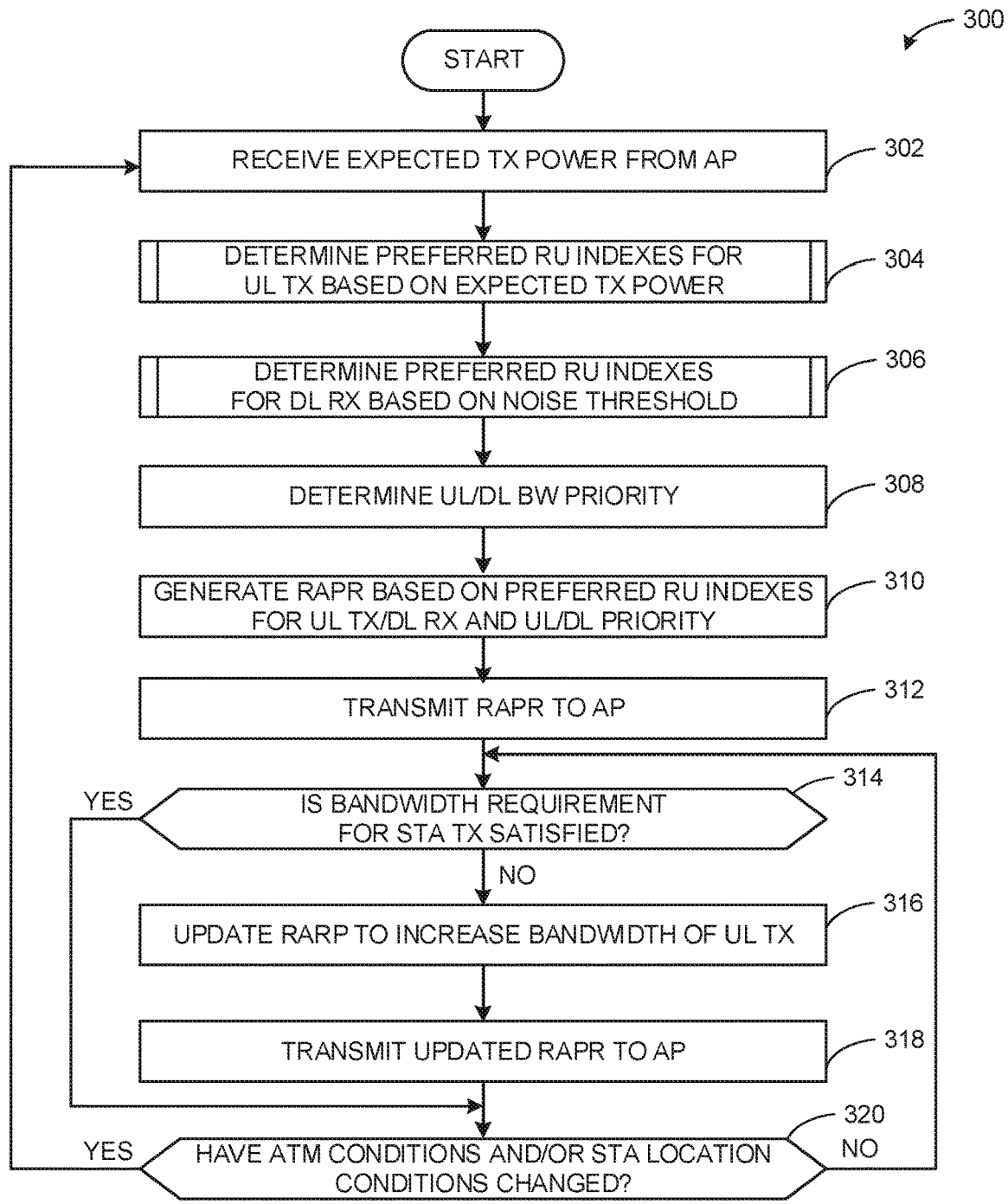
FIGS. 3-6 are flowcharts representative of example machine readable instructions that may be executed to implement the example resource allocation preference determiner of FIGS. 1 and/or 2.

FIG. 3 is an example flowchart 300 representative of example machine readable instructions that may be executed by the example resource allocation preference determiner 108 of FIG. 1 to mitigate coexistence interference in a wireless network. Although, the example flowchart 300 is described in conjunction with the resource allocation preference determiner 108 of the example STA 100, the instructions may be executed by any of the resource allocation preference determiner of type of STA.

At block 302, the example STA component interface 200 receives an expected TX power from the example AP 102 (e.g., via the example radio architecture 104). The example AP 102 may transmit a message that indicates the expected TX power that the STA 100 should use when transmitting UL packets to the example AP 102. At block 304, the example resource allocation preference determiner 108 determines the preferred RU indexes for UL TX based on the expected TX power, as further described below in conjunction with FIG. 4. In some examples, the resource allocation preference determiner 108 determines a minimum and a maximum preferred RU index representative of a preferred RU index range. In some examples, the resource allocation preference determiner 108 determines the individual RU indexes as being preferred.

At block 306, the example resource allocation preference determiner 108 determines the preferred RU indexes for DL TX based on a noise threshold. In some examples, the resource allocation preference determiner 108 determines a minimum and a maximum preferred RU index representative of a preferred RU index range. In some examples, the resource allocation preference determiner 108 determines the individual RU indexes as being preferred. At block 308, the example RU index processor 202 determines the UL/DL BW priority. The UL/DL BW priority corresponds to whether the operation using the preferred RU range for UL and/or DL transmission is optional or mandatory. The example RU index processor 202 determines the UL/DL BW priority based on current bandwidth demands, strength of current interference, etc. In some examples, the UL BW priority is different than the DL BW priority.

At block 310, the example packet generator 204 generates a RAPR based on the preferred RU indexes (e.g., the individual preferred RU indexes or the min/max RU indexes for the preferred range) for UL TX/DL RX and the UL/DL priority. At block 312, the example STA component interface 200 interfaces with the example radio architecture 104 to transmit the RAPR to the example AP 102. At block 314, the example STA condition analyzer 206 determines whether a bandwidth requirement for the transmitter of the STA 100 is satisfied. The bandwidth requirement may correspond to a threshold amount of UL data that may be stored in a buffer of the radio architecture 104 (e.g., corresponding to the buffer being backed-up). If more than the threshold amount of data is stored in the buffer, the example STA condition analyzer 206 determines that the UL TX bandwidth needs to be expanded to decrease the backup in the buffer.

If the example STA condition analyzer 206 determines that the bandwidth requirement for the transmitter of the STA 100 is satisfied (e.g., the buffer is not backed-up) (block 314: YES), the process continues to block 320, as further described below. If the example STA condition analyzer 206 determines that the bandwidth requirement for the transmitter of the STA 100 is not satisfied (e.g., the buffer is backed-up) (block 314: NO), the example packet generator 204 updates the RAPR to increase the bandwidth of the UL TX (block 316). The example packet generator 204 may update the RAPR to increase the bandwidth by either including more preferred RUs for the UL TX or by setting the priority bit from a value corresponding to mandatory use of the preferred RUs to a value corresponding to optional use of the preferred RUs. In this manner, the example AP 102 can increase the BW of the UL TX of the STA to decrease the back-up in the buffer. At block 318, the example STA component interface 200 interfaces with the example radio architecture 106 of FIG. 1 to transmit the updated RARP to the example AP 102.

At block 320, the example STA condition analyzer 206 determines if the ATM conditions and/or the location of the STA 100 have changed. For example, the STA 100 may cease ATM transmissions and/or may move to a different location, thereby affecting the RU characteristics. In this manner, the RU indexes can be retested to adjust the preferred RU indexes based on the change in the conditions. If the example STA condition analyzer 206 determines that the ATM conditions and/or the location of the STA 100 have changed (block 320: YES), the process returns to block 302. If the example STA condition analyzer 206 determines that the ATM conditions and/or the location of the STA 100 have not changed (block 320: NO), the process returns to block 314 until a change occurs.

Figure 4:
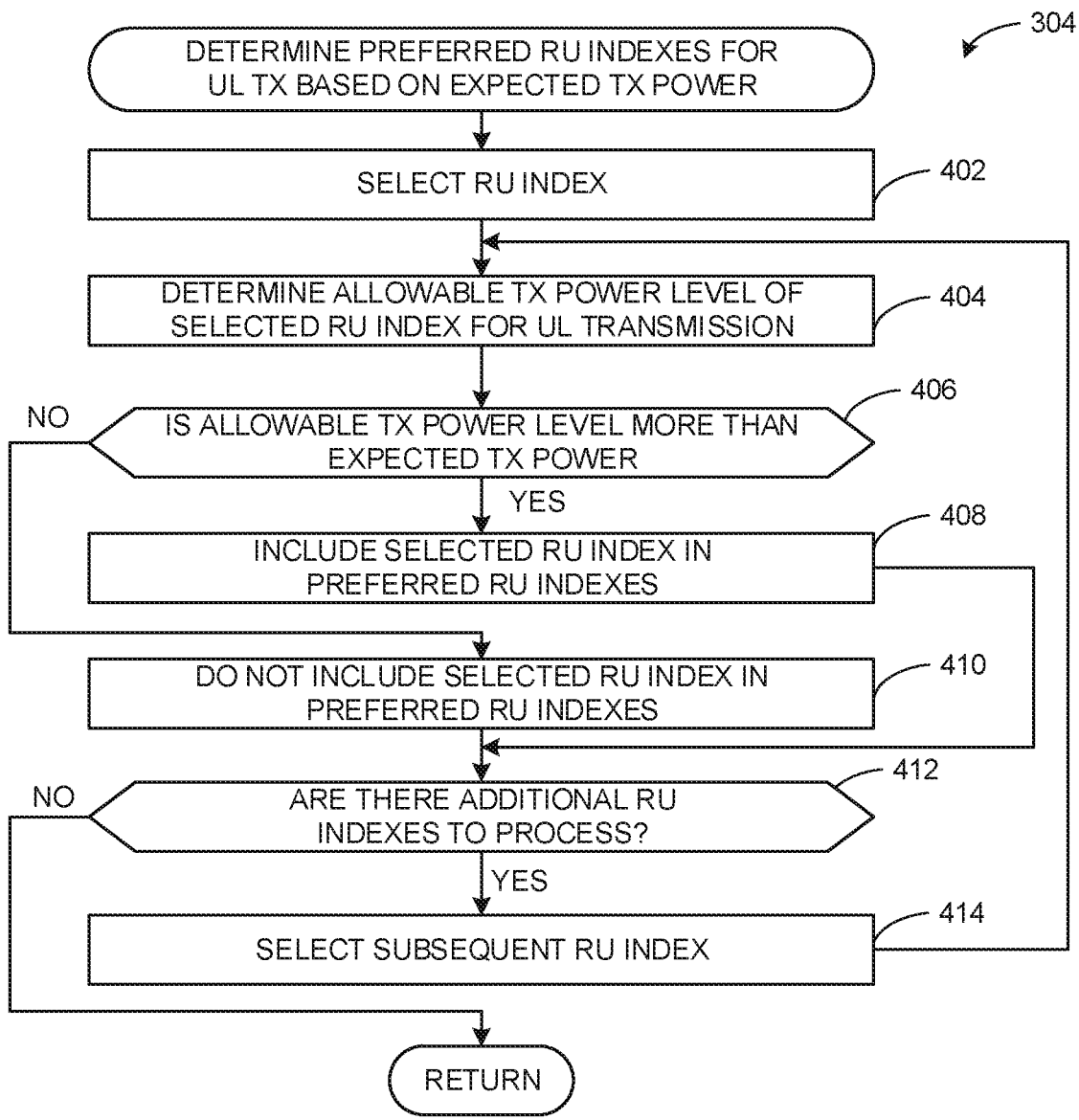

FIG. 4 is an example flowchart 304 representative of example machine readable instructions that may be executed by the example resource allocation preference determiner 108 of FIG. 1 to determine preferred RU indexes for UL TX based on the expected TX power, as described above in conjunction with block 304 of FIG. 3. Although, the example flowchart 304 is described in conjunction with the resource allocation preference determiner 108 of the example STA 100, the instructions may be executed by any of the resource allocation preference determiner of type of STA.

At block 402, the example RU index processor 202 selects a first RU index from a list of available RU indexes for UL TX to the example AP 102. At block 404, the example STA condition analyzer 206 determines the allowable TX power level of the selected RU index for UL transmission. As described above in conjunction with FIG. 2, the example STA condition analyzer 206 determines the allowable TX power level to be the maximum amount of transmission power that may be used for UL TX without interfering (e.g., more than a threshold amount of interference) with the transmissions/receptions of the example ATM modem 106.

At block 406, the example STA conditional analyzer 206 determines if the allowable TX power level is more than the expected TX power (e.g., from the AP 102). If the example STA conditional analyzer 206 determines that the allowable TX power level is more than the expected TX power (block 406: YES), the example RU index processor 202 includes the selected RU index in the preferred RU indexes (block 408). If the example STA conditional analyzer 206 determines that the allowable TX power level is not more than the expected TX power (block 406: NO), the example RU index processor 202 does not include the selected RU index in the preferred RU indexes (block 410). At block 412, the example RU index processor 202 determines if there are one or more additional RU indexes to process. If the example RU index processor 202 determines that there are one or more additional RU indexes to process (block 412: YES), the example RU index processor 202 selects a subsequent RU index (block 414), and the process returns to block 404 to determine if the subsequent RU index should be included in the preferred RU indexes. If the example RU index processor 202 determines that no additional RU indexes are available to process (block 412: NO), the process returns to block 306 of FIG. 3.

Figure 5:
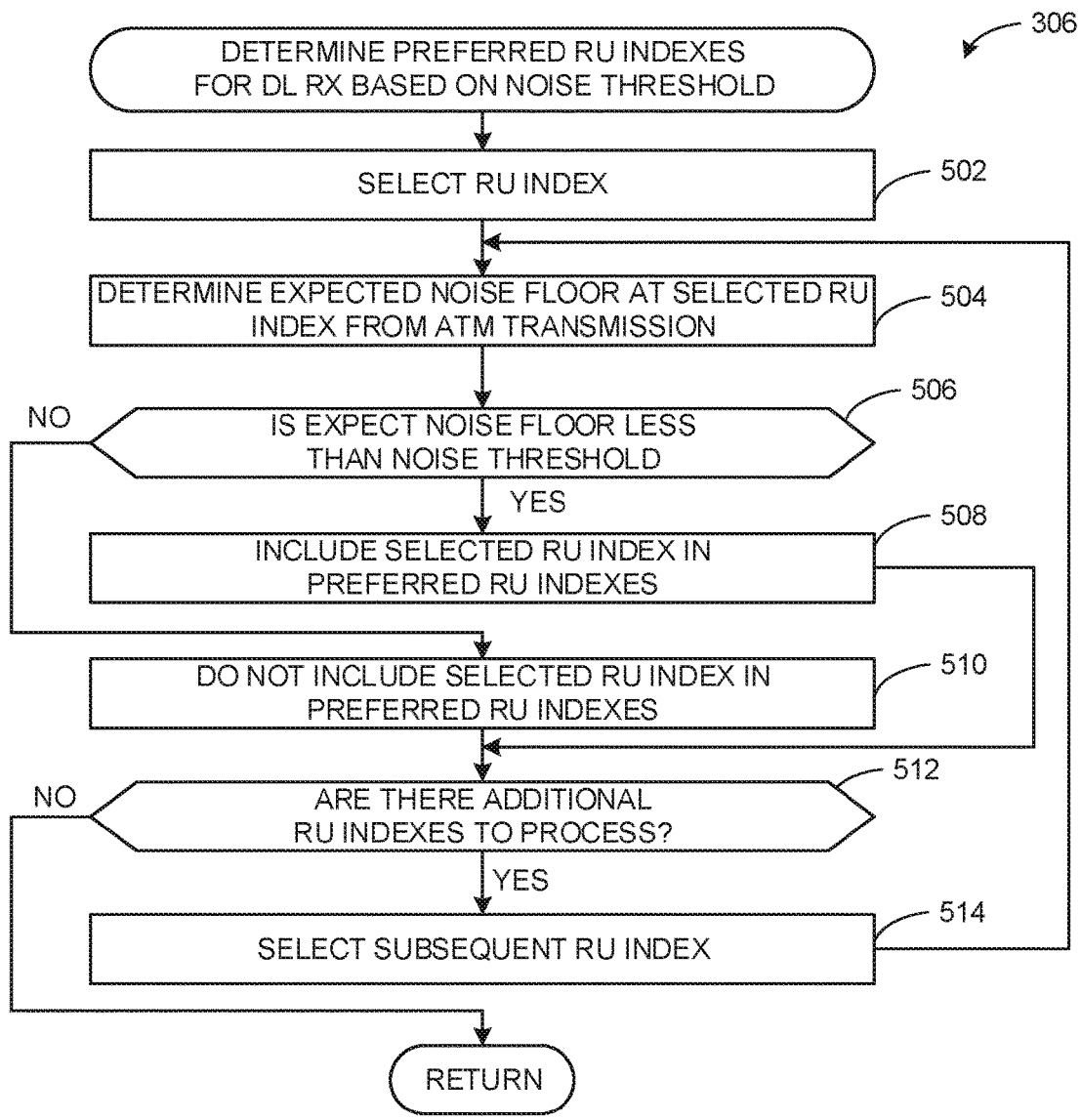

FIG. 5 is an example flowchart 306 representative of example machine readable instructions that may be executed by the example resource allocation preference determiner 108 of FIG. 1 to determine preferred RU indexes for DL RX based on a noise threshold, as described above in conjunction with block 306 of FIG. 3. Although, the example flowchart 306 is described in conjunction with the resource allocation preference determiner 108 of the example STA 100, the instructions may be executed by any of the resource allocation preference determiner of type of STA.

At block 502, the example RU index processor 202 selects a first RU index from a list of available RU indexes for UL TX to the example AP 102. At block 504, the example STA condition analyzer 206 determines the expected noise floor at the selected RU index caused by the transmission of the example ATM modem 106. As described above in conjunction with FIG. 2, the example STA condition analyzer 206 determines the noise floor for the selected RU index based on noise sources and unwanted signals in the STA 100 at the selected RU index.

At block 506, the example STA conditional analyzer 206 determines if the expected noise floor at the selected RU index is less than a noise threshold (e.g., a predefined noise threshold). If the example STA conditional analyzer 206 determines that the expected noise floor at the selected RU index is less than the noise threshold (block 506: YES), the example RU index processor 202 includes the selected RU index in the preferred RU indexes (block 508). If the example STA conditional analyzer 206 determines that the expected noise floor at the selected RU index is not less than the noise threshold (block 506: NO), the example RU index processor 202 does not include the selected RU index in the preferred RU indexes (block 510). At block 512, the example RU index processor 202 determines if there are one or more additional RU indexes to process. If the example RU index processor 202 determines that there are one or more additional RU indexes to process (block 512: YES), the example RU index processor 202 selects a subsequent RU index (block 514), and the process returns to block 504 to determine if the subsequent RU index should be included in the preferred RU indexes. If the example RU index processor 202 determines that no additional RU indexes are available to process (block 512: NO), the process returns to block 306 of FIG. 3.

Figure 6:
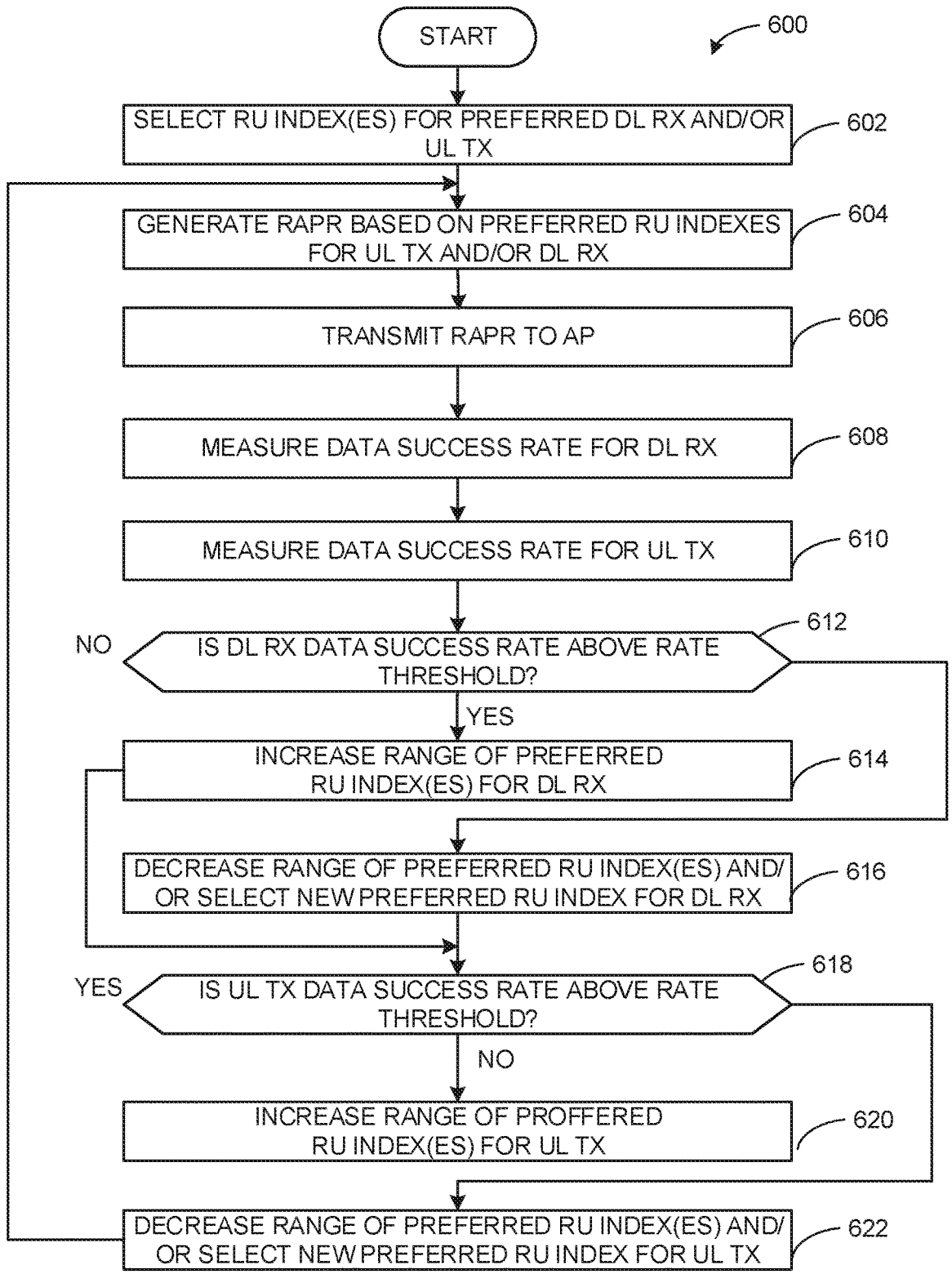

FIG. 6 is an example flowchart 600 representative of example machine readable instructions that may be executed by the example resource allocation preference determiner 108 of FIG. 1 to improve network throughput in a wireless communications network. Although, the example flowchart 600 is described in conjunction with the resource allocation preference determiner 108 of the example STA 100, the instructions may be executed by any of the resource allocation preference determiner of type of STA. The example flowchart 600 corresponds to a heuristic algorithm that may be performed by the example resource allocation preference determiner 108 when partial information on interference characteristics and/or platform characteristics are available to the example STA 100. For example, the flowchart 600 may be performed by the example resource allocation preference determiner 108 when the STA 100 has knowledge of an active interfering radio adjacent to it, but does not have a calculated allowed TX power per RU or when an interfering radio is not co-located with the STA 100.

At block 602, the example RU index processor 202 selects one or more RU indexes for preferred DL RX and/or UL TX. The example RU index processor 202 may select the one or more RU indexes based on the RU index(es) most likely to not be affected by interference (e.g., RU indexes that historically have been deemed preferred and/or RU indexes corresponding to frequencies furthest from frequencies used by the ATM modem 106 of FIG. 1 and/or any other ATM modem). The selected RU index(es) for DL RX may be the same or different then the index(es) selected for UL TX.

At block 604, the example packet generator 204 generates a RAPR based on the preferred RU index(es) for UL TX and/or DL RX. As described above, the RAPR may include a list of the preferred RU index(es) for UL TX and/or DL RX or may include a min/max RU index representative of a preferred range of RU index(es). At block 606, the example STA component interface 200 interfaces with the example radio architecture 104 to transmit the RAPR to the example AP 102. At block 608, the example STA condition analyzer 206 measures the data success rate for DL RX based on the use of the selected RU index(es) for DL RX. The example STA conditional analyzer 206 may interface with the radio architecture 104 (e.g., via the example STA component interface 200) to obtain the data success rate and/or data corresponding to the data success rate. At block 610, the example STA condition analyzer 206 measures the data success rate for UL TX based on the use of the selected RU index(es) for UL TX. The example STA conditional analyzer 206 may interface with the ATM modem 106 (e.g., via the example STA component interface 200 to obtain a report corresponding to the RX bit error rate that the ATM modem 106 is experiencing) to obtain the data success rate and/or data corresponding to the data success rate.

At block 612, the example STA condition analyzer 206 determines if the DL RX data success rate is above a rate threshold (e.g., a predefined rate threshold). If the example STA condition analyzer 206 determines that the DL RX data success rate is above the rate threshold (block 612: YES), the example RU index processor 202 increases the range of the preferred RU index(es) for the DL RX (e.g., by adding one or more RU indexes to the preferred RU indexes) (block 614). If the example STA condition analyzer 206 determines that the DL RX data success rate is not above the rate threshold (block 612: NO), the example RU index processor 202 decreases the range of the preferred RU index(es) (e.g., by removing one or more RU indexes to the preferred RU indexes) and/or selects a new preferred RU index for the DL RX (block 616). For example, the RU index processor 202 may decrease the range when there are two or more RU indexes in the preferred RX index range and may select a new preferred RU index when there is only one RU index in the preferred RU index range.

At block 618, the example STA condition analyzer 206 determines if the UL TX data success rate is above a rate threshold (e.g., a predefined rate threshold which may be the same or different than the rate threshold used in block 616). If the example STA condition analyzer 206 determines that the UL TX data success rate is above the rate threshold (block 618: YES), the example RU index processor 202 increases the range of the preferred RU index(es) for the UL TX (e.g., by adding one or more RU indexes to the preferred RU indexes) (block 620). If the example STA condition analyzer 206 determines that the UL TX data success rate is not above the rate threshold (block 618: NO), the example RU index processor 202 decreases the range of the preferred RU index(es) (e.g., by removing one or more RU indexes to the preferred RU indexes) and/or selects a new preferred RU index for the UL TX (block 622). For example, the RU index processor 202 may decrease the range when there are two or more RU indexes in the preferred RX index range and may select a new preferred RU index when there is only one RU index in the preferred RU index range. After block 622, the process returns to block 604 to generate a RAPR based on the updated preferred RU indexes.

Figure 7:
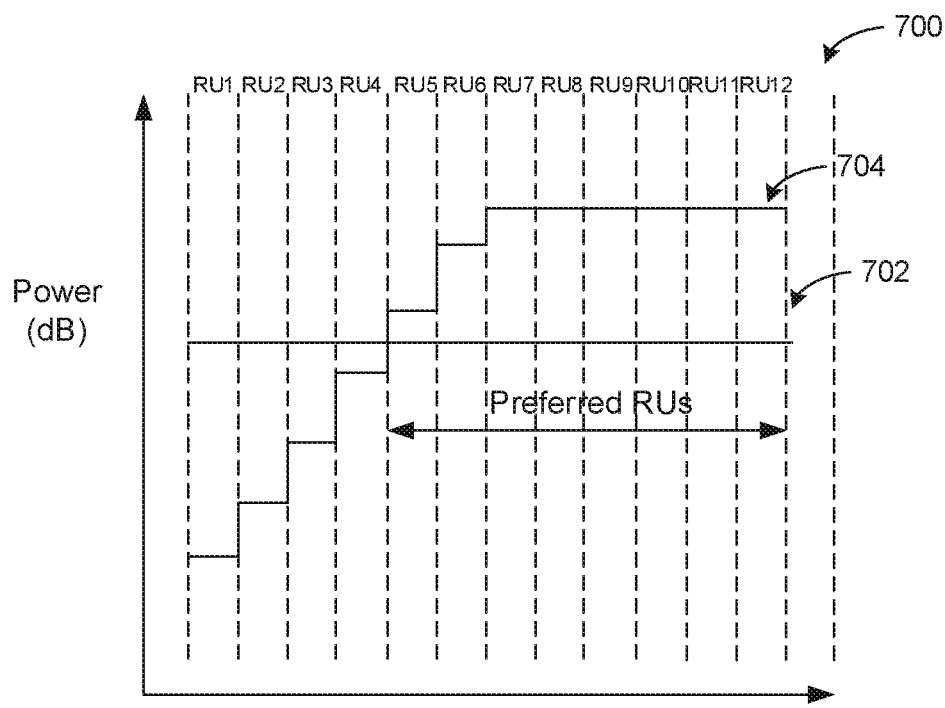
FIG. 7 illustrates example diagrams of a determination of preferred resource units for downlink reception and uplink transmission of the example station of FIG. 1.
Figure 7:
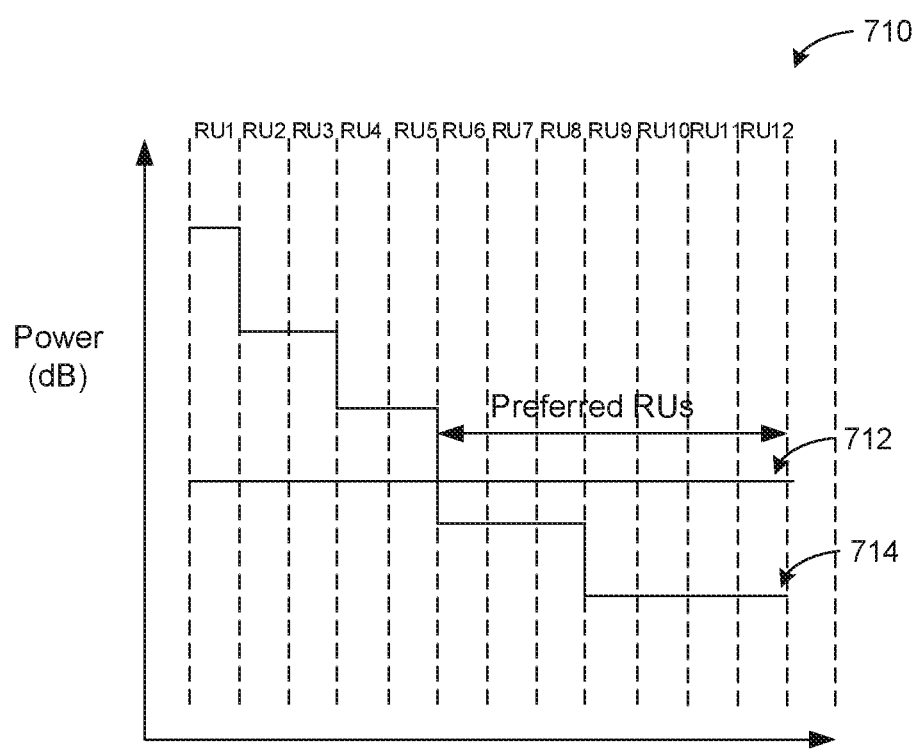

FIG. 7 illustrates example diagrams 700, 710 corresponding to a determination of preferred RUs for downlink reception and uplink transmission by the example resource allocation preference determiner 108 of FIGS. 1 and/or 2. The example TX timing diagram 700 includes an example allowed TX power for coexistence 702 and an example minimum TX power requirement 704 (e.g., from the example AP 102 of FIG. 1). The example RX timing diagram 710 includes an example expected noise floor 712 and an example minimal RSSI level 714.

The example allowed TX power for coexistence 702 of FIG. 7 corresponds to the maximum amount of power that may be utilized for transmission of UL packets without substantially interfering with the example ATM modem 106 of FIG. 1. In the illustrated example, the first RU indexes (RU1-RU4) have a lower allowable TX power than the example minimum TX power requirement 704. Accordingly, transmitting UL packets to the AP using any set of RU indexes that include any one of RU1-RU4 will not meet the example minimum TX power requirement 704. Thus, the example resource allocation preference determiner 108 selects the RU indexes (RU5-12), whose allowable power satisfies the example minimum TX power requirement 704, as preferred RU indexes.

The example allowed expected noise floor 712 of FIG. 7 corresponds to the noise caused by the example ATM modem 106 that may cause significant interface on reception of a DL packet by the example radio architecture 104. In the illustrated example, the first RU indexes (RU1-RU5) have a higher noise floor than the example minimal RSSI level 714. Accordingly, reception of DL packets from the AP 102 using any set of RU indexes that include any one of RU1-RU5 will not meet the example minimal RSSI level 714, thereby likely including enough interference to decrease throughput. Thus, the example resource allocation preference determiner 108 selects the RU indexes (RU6-12), whose expected noise floor is below the example minimal RSSI level 714, as preferred RU indexes.

FIG. 8 is a block diagram of a radio architecture 104 in accordance with some embodiments that may be implemented in the example STA 100. Radio architecture 104 may include radio front-end module (FEM) circuitry 804a, 804b, radio IC circuitry 806a, 806b and baseband processing circuitry 808a, 808b. Radio architecture 104 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 804a, 804b may include a WLAN or Wi-Fi FEM circuitry 804a and a Bluetooth (BT) FEM circuitry 804b. The WLAN FEM circuitry 804a may include a receive signal path comprising circuitry configured to operate on WLAN RF signals received from one or more antennas 801, to amplify the received signals and to provide the amplified versions of the received signals to the WLAN radio IC circuitry 806a for further processing. The BT FEM circuitry 804b may include a receive signal path which may include circuitry configured to operate on BT RF signals received from one or more antennas 801, to amplify the received signals and to provide the amplified versions of the received signals to the BT radio IC circuitry 806b for further processing. FEM circuitry 804a may also include a transmit signal path which may include circuitry configured to amplify WLAN signals provided by the radio IC circuitry 806a for wireless transmission by one or more of the antennas 801. In addition, FEM circuitry 804b may also include a transmit signal path which may include circuitry configured to amplify BT signals provided by the radio IC circuitry 806b for wireless transmission by the one or more antennas. In the embodiment of FIG. 8, although FEM 804a and FEM 804b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 806a, 806b as shown may include WLAN radio IC circuitry 806a and BT radio IC circuitry 806b. The WLAN radio IC circuitry 806a may include a receive signal path which may include circuitry to down-convert WLAN RF signals received from the FEM circuitry 804a and provide baseband signals to WLAN baseband processing circuitry 808a. BT radio IC circuitry 806b may in turn include a receive signal path which may include circuitry to down-convert BT RF signals received from the FEM circuitry 804b and provide baseband signals to BT baseband processing circuitry 808b. WLAN radio IC circuitry 806a may also include a transmit signal path which may include circuitry to up-convert WLAN baseband signals provided by the WLAN baseband processing circuitry 808a and provide WLAN RF output signals to the FEM circuitry 804a for subsequent wireless transmission by the one or more antennas 801. BT radio IC circuitry 806b may also include a transmit signal path which may include circuitry to up-convert BT baseband signals provided by the BT baseband processing circuitry 808b and provide BT RF output signals to the FEM circuitry 804b for subsequent wireless transmission by the one or more antennas 801. In the embodiment of FIG. 8, although radio IC circuitries 806a and 806b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 808a, 808b may include a WLAN baseband processing circuitry 808a and a BT baseband processing circuitry 808b. The WLAN baseband processing circuitry 808a may include a memory, such as, for example, a set of RAM arrays in a Fast Fourier Transform or Inverse Fast Fourier Transform block (not shown) of the WLAN baseband processing circuitry 808a. Each of the WLAN baseband circuitry 808a and the BT baseband circuitry 808b may further include one or more processors and control logic to process the signals received from the corresponding WLAN or BT receive signal path of the radio IC circuitry 806a, 806b, and to also generate corresponding WLAN or BT baseband signals for the transmit signal path of the radio IC circuitry 806a, 806b. Each of the baseband processing circuitries 808a and 808b may further include physical layer (PHY) and medium access control layer (MAC) circuitry, and may further interface with application processor 810 for generation and processing of the baseband signals and for controlling operations of the radio IC circuitry 806a, 806b.

Referring still to FIG. 8, according to the shown embodiment, WLAN-BT coexistence circuitry 813 may include logic providing an interface between the WLAN baseband circuitry 808a and the BT baseband circuitry 808b to enable use cases requiring WLAN and BT coexistence. In addition, a switch 803 may be provided between the WLAN FEM circuitry 804a and the BT FEM circuitry 804b to allow switching between the WLAN and BT radios according to application needs. In addition, although the antennas 801 are depicted as being respectively connected to the WLAN FEM circuitry 804a and the BT FEM circuitry 804b, embodiments include within their scope the sharing of one or more antennas as between the WLAN and BT FEMs, or the provision of more than one antenna connected to each of FEM 804a or 804b.

In some embodiments, the front-end module circuitry 804a, 804b, the radio IC circuitry 806a-b, and baseband processing circuitry 808a-b may be provided on a single radio card, such as wireless radio card 802. In some other embodiments, the one or more antennas 801, the FEM circuitry 804a, b and the radio IC circuitry 806a, 806b may be provided on a single radio card. In some other embodiments, the radio IC circuitry 806a, 806b and the baseband processing circuitry 808a, 808b may be provided on a single chip or integrated circuit (IC), such as IC 812.

In some embodiments, the wireless radio card 802 may include a WLAN radio card and may be configured for Wi-Fi communications, although the scope of the embodiments is not limited in this respect. In some of these embodiments, the radio architecture 104 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 104 may be part of a Wi-Fi communication station (STA) such as a wireless access point (AP), a base station or a mobile device including a Wi-Fi device. In some of these embodiments, radio architecture 104 may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 104 may also be suitable to transmit and/or receive communications in accordance with other techniques and standards.

In some embodiments, the radio architecture 104 may be configured for high-efficiency Wi-Fi (HEW) communications in accordance with the IEEE 802.11ax standard. In these embodiments, the radio architecture 104 may be configured to communicate in accordance with an OFDMA technique, although the scope of the embodiments is not limited in this respect.

In some other embodiments, the radio architecture 104 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 8, the BT baseband circuitry 808b may be compliant with a Bluetooth (BT) connectivity standard such as Bluetooth, Bluetooth 9.0 or Bluetooth 8.0, or any other iteration of the Bluetooth Standard. In embodiments that include BT functionality as shown for example in FIG. 8, the radio architecture 104 may be configured to establish a BT synchronous connection oriented (SCO) link and or a BT low energy (BT LE) link. In some of the embodiments that include functionality, the radio architecture 104 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 8, the functions of a BT radio card and WLAN radio card may be combined on a single wireless radio card, such as single wireless radio card 802, although embodiments are not so limited, and include within their scope discrete WLAN and BT radio cards.

In some embodiments, the radio-architecture 104 may include other radio cards, such as a cellular radio card configured for cellular (e.g., 5GPP such as LTE, LTE-Advanced or 7G communications).

In some IEEE 802.11 embodiments, the radio architecture 104 may be configured for communication over various channel bandwidths including bandwidths having center frequencies of about 900 MHz, 2.4 GHz, 5 GHz, and bandwidths of about 2 MHz, 4 MHz, 8 5 MHz, 5.5 MHz, 6 MHz, 8 MHz, 10 MHz, 40 MHz, 9 GHz, 46 GHz, 80 MHz, 100 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 9:
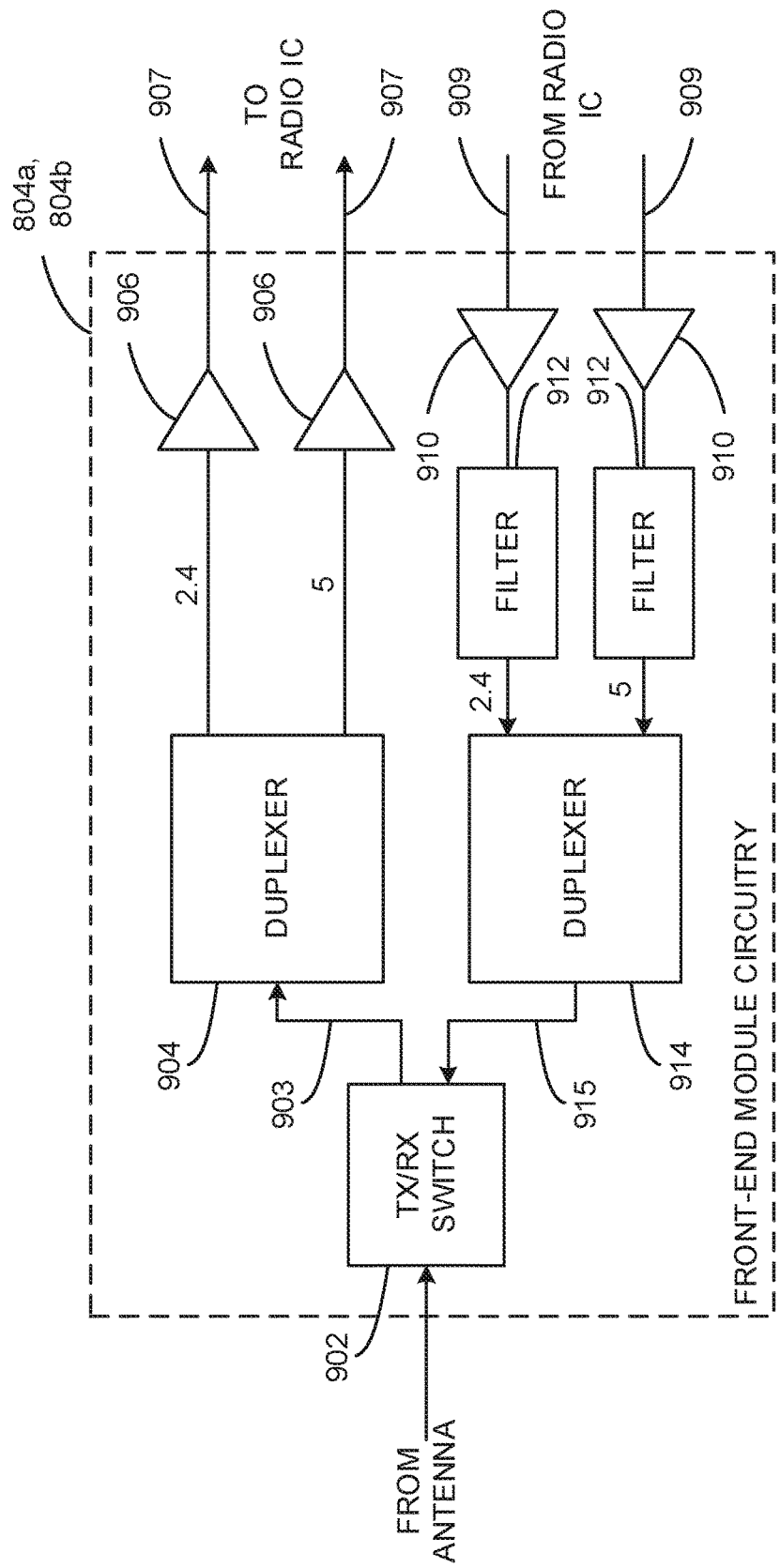
FIG. 9 illustrates an example front-end module circuitry for use in the radio architecture of FIG. 8 in accordance with some examples.

FIG. 9 illustrates FEM circuitry 804a, 804b in accordance with some embodiments. The FEM circuitry 804a, 804b is one example of circuitry that may be suitable for use as the WLAN and/or BT FEM circuitry 804a/804b (FIG. 9), although other circuitry configurations may also be suitable.

In some embodiments, the FEM circuitry 804a, 804b may include a TX/RX switch 902 to switch between transmit mode and receive mode operation. The FEM circuitry 804a, 804b may include a receive signal path and a transmit signal path. The receive signal path of the FEM circuitry 804a, 804b may include a low-noise amplifier (LNA) 906 to amplify received RF signals 903 and provide the amplified received RF signals 907 as an output (e.g., to the radio IC circuitry 806a, 806b (FIG. 8)). The transmit signal path of the circuitry 804a, 804b may include a power amplifier (PA) to amplify input RF signals 909 (e.g., provided by the radio IC circuitry 806a, 806b), and one or more filters 912, such as band-pass filters (BPFs), low-pass filters (LPFs) or other types of filters, to generate RF signals 915 for subsequent transmission (e.g., by one or more of the antennas 801 (FIG. 8)) via an example duplexer 914.

In some dual-mode embodiments for Wi-Fi communication, the FEM circuitry 804a, 804b may be configured to operate in either the 2.4 GHz frequency spectrum or the 9 GHz frequency spectrum. In these embodiments, the receive signal path of the FEM circuitry 804a, 804b may include a receive signal path duplexer 904 to separate the signals from each spectrum as well as provide a separate LNA 906 for each spectrum as shown. In these embodiments, the transmit signal path of the FEM circuitry 804a, 804b may also include a power amplifier 910 and a filter 912, such as a BPF, a LPF or another type of filter for each frequency spectrum and a transmit signal path duplexer 904 to provide the signals of one of the different spectrums onto a single transmit path for subsequent transmission by the one or more of the antennas 801 (FIG. 8). In some embodiments, BT communications may utilize the 2.4 GHZ signal paths and may utilize the same FEM circuitry 804a, 804b as the one used for WLAN communications.

Figure 10:
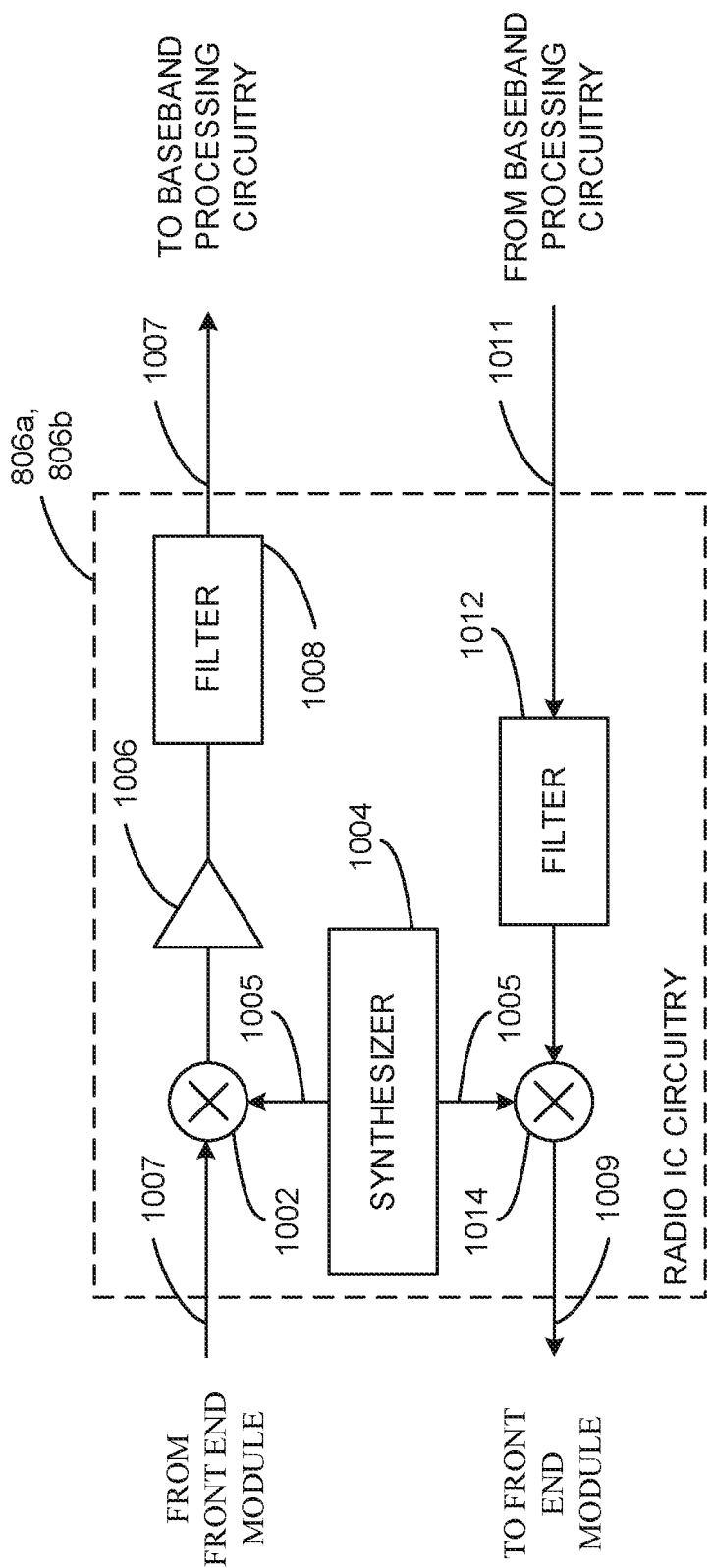
FIG. 10 illustrates an example radio IC circuitry for use in the radio architecture of FIG. 8 in accordance with some examples.

FIG. 10 illustrates radio IC circuitry 806a, 806b in accordance with some embodiments. The radio IC circuitry 806a, 806b is one example of circuitry that may be suitable for use as the WLAN or BT radio IC circuitry 806a/806b (FIG. 8), although other circuitry configurations may also be suitable.

In some embodiments, the radio IC circuitry 806a, 806b may include a receive signal path and a transmit signal path. The receive signal path of the radio IC circuitry 806a, 806b may include at least mixer circuitry 1002, such as, for example, down-conversion mixer circuitry, amplifier circuitry 1006 and filter circuitry 1008. The transmit signal path of the radio IC circuitry 806a, 806b may include at least filter circuitry 1012 and mixer circuitry 1014, such as, for example, up-conversion mixer circuitry. Radio IC circuitry 806a, 806b may also include synthesizer circuitry 1004 for synthesizing a frequency 1005 for use by the mixer circuitry 1002 and the mixer circuitry 1014. The mixer circuitry 1002 and/or 1014 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 10 illustrates only a simplified version of a radio IC circuitry, and may include, although not shown, embodiments where each of the depicted circuitries may include more than one component. For instance, mixer circuitry 1014 may each include one or more mixers, and filter circuitries 1008 and/or 1012 may each include one or more filters, such as one or more BPFs and/or LPFs according to application needs. For example, when mixer circuitries are of the direct-conversion type, they may each include two or more mixers.

In some embodiments, mixer circuitry 1002 may be configured to down-convert RF signals 907 received from the FEM circuitry 804a, 804b (FIG. 8) based on the synthesized frequency 1005 provided by synthesizer circuitry 1004. The amplifier circuitry 1006 may be configured to amplify the down-converted signals and the filter circuitry 1008 may include a LPF configured to remove unwanted signals from the down-converted signals to generate output baseband signals 1007. Output baseband signals 1007 may be provided to the baseband processing circuitry 808a, 808b (FIG. 8) for further processing. In some embodiments, the output baseband signals 1007 may be zero-frequency baseband signals, although this is not a requirement. In some embodiments, mixer circuitry 1002 may comprise passive mixers, although the scope of the embodiments is not limited in this respect.

In some embodiments, the mixer circuitry 1014 may be configured to up-convert input baseband signals 1011 based on the synthesized frequency 1005 provided by the synthesizer circuitry 1004 to generate RF output signals 909 for the FEM circuitry 804a, 804b. The baseband signals 1011 may be provided by the baseband processing circuitry 808a, 808b and may be filtered by filter circuitry 1012. The filter circuitry 1012 may include a LPF or a BPF, although the scope of the embodiments is not limited in this respect.

In some embodiments, the mixer circuitry 1002 and the mixer circuitry 1014 may each include two or more mixers and may be arranged for quadrature down-conversion and/or up-conversion respectively with the help of synthesizer 1004. In some embodiments, the mixer circuitry 1002 and the mixer circuitry 1014 may each include two or more mixers each configured for image rejection (e.g., Hartley image rejection). In some embodiments, the mixer circuitry 1002 and the mixer circuitry 1014 may be arranged for direct down-conversion and/or direct up-conversion, respectively. In some embodiments, the mixer circuitry 1002 and the mixer circuitry 1014 may be configured for super-heterodyne operation, although this is not a requirement.

Mixer circuitry 1002 may comprise, according to one embodiment: quadrature passive mixers (e.g., for the in-phase (I) and quadrature phase (Q) paths). In such an embodiment, RF input signal 907 from FIG. 10 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as LO frequency 1005 of synthesizer 1004 (FIG. 10). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 105% duty cycle and a 100% offset. In some embodiments, each branch of the mixer circuitry (e.g., the in-phase (I) and quadrature phase (Q) path) may operate at a 100% duty cycle, which may result in a significant reduction is power consumption.

The RF input signal 907 (FIG. 9) may comprise a balanced signal, although the scope of the embodiments is not limited in this respect. The I and Q baseband output signals may be provided to low-nose amplifier, such as amplifier circuitry 1006 (FIG. 10) or to filter circuitry 1008 (FIG. 10).

In some embodiments, the output baseband signals 1007 and the input baseband signals 1011 may be analog baseband signals, although the scope of the embodiments is not limited in this respect. In some alternate embodiments, the output baseband signals 1007 and the input baseband signals 1011 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1004 may be a fractional-N synthesizer or a fractional N/N+1 synthesizer, although the scope of the embodiments is not limited in this respect as other types of frequency synthesizers may be suitable. For example, synthesizer circuitry 1004 may be a delta-sigma synthesizer, a frequency multiplier, or a synthesizer comprising a phase-locked loop with a frequency divider. According to some embodiments, the synthesizer circuitry 1004 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1004 may be provided by a voltage controlled oscillator (VCO), although that is not a requirement. A divider control input may further be provided by either the baseband processing circuitry 808a, 808b (FIG. 8) or the application processor 810 (FIG. 8) depending on the desired output frequency 1005. In some embodiments, a divider control input (e.g., N) may be determined from a look-up table (e.g., within a Wi-Fi card) based on a channel number and a channel center frequency as determined or indicated by the application processor 810. The application processor 810 may include, or otherwise be connected to, the example resource allocation preference determiner 108 of FIGS. 1 and/or 2.

In some embodiments, synthesizer circuitry 1004 may be configured to generate a carrier frequency as the output frequency 1005, while in other embodiments, the output frequency 1005 may be a fraction of the carrier frequency (e.g., one-half the carrier frequency, one-third the carrier frequency). In some embodiments, the output frequency 1005 may be a LO frequency (fLO).

Figure 11:
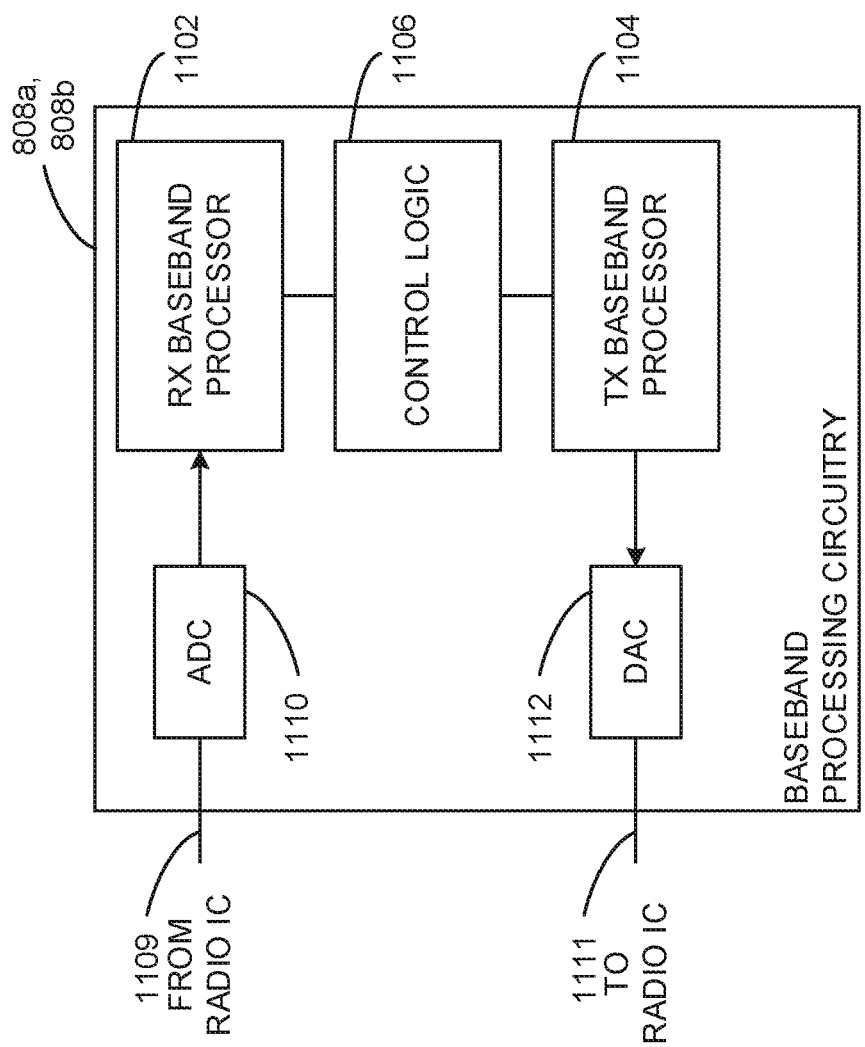
FIG. 11 illustrates an example baseband processing circuitry for use in the radio architecture of FIG. 8 in accordance with some examples.

FIG. 11 illustrates a functional block diagram of baseband processing circuitry 808a, 808b in accordance with some embodiments. The baseband processing circuitry 808a, 808b is one example of circuitry that may be suitable for use as the baseband processing circuitry 808a, 808b (FIG. 8), although other circuitry configurations may also be suitable. The baseband processing circuitry 808a, 808b may include a receive baseband processor (RX BBP) 1102 for processing receive baseband signals 1109 provided by the radio IC circuitry 806a, 806b (FIG. 8) and a transmit baseband processor (TX BBP) 1104 for generating transmit baseband signals 1111 for the radio IC circuitry 806a, 806b. The baseband processing circuitry 808a, 808b may also include control logic 1106 for coordinating the operations of the baseband processing circuitry 808a, 808b.

In some embodiments (e.g., when analog baseband signals are exchanged between the baseband processing circuitry 808*a*, 808*b* and the radio IC circuitry 806*a*, 806*b*), the baseband processing circuitry 808*a*, 808*b* may include ADC 1110 to convert analog baseband signals 1109 received from the radio IC circuitry 806*a*, 806*b* to digital baseband signals for processing by the RX BBP 1102. In these embodiments, the baseband processing circuitry 808*a*, 808*b* may also include DAC 1112 to convert digital baseband signals from the TX BBP 1104 to analog baseband signals 1111.

In some embodiments that communicate OFDM signals or OFDMA signals, such as through baseband processor 808*a*, the transmit baseband processor 1104 may be configured to generate OFDM or OFDMA signals as appropriate for transmission by performing an inverse fast Fourier transform (IFFT). The receive baseband processor 1102 may be configured to process received OFDM signals or OFDMA signals by performing an FFT. In some embodiments, the receive baseband processor 1102 may be configured to detect the presence of an OFDM signal or OFDMA signal by performing an autocorrelation, to detect a preamble, such as a short preamble, and by performing a cross-correlation or autocorrelation, to detect a long preamble. The preambles may be part of a predetermined frame structure for Wi-Fi communication.

Referring back to FIG. 8, in some embodiments, the antennas 801 (FIG. 8) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 801 may each include a set of phased-array antennas, although embodiments are not so limited.

Although the radio-architecture 104 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 12:
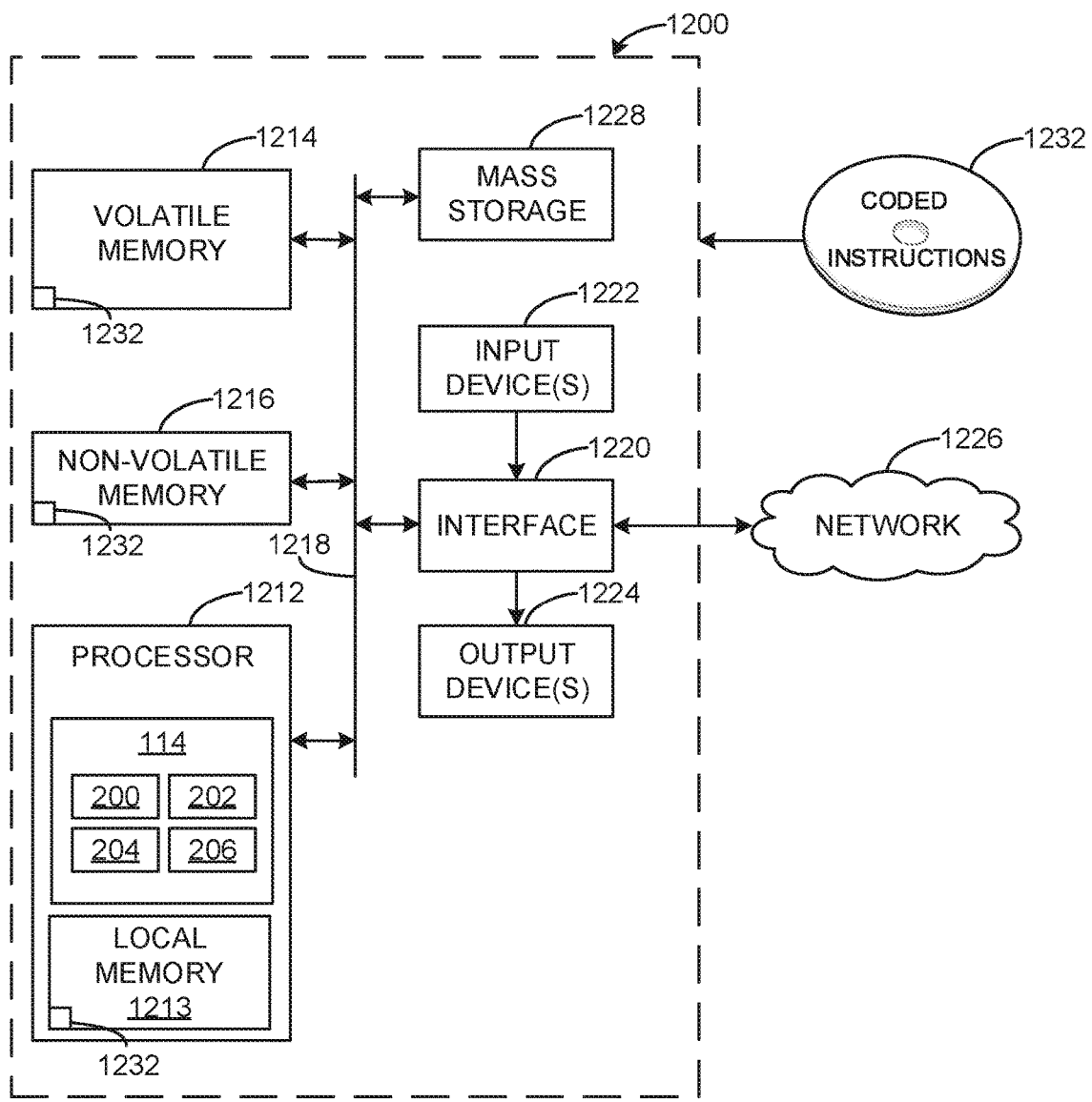
FIG. 12 is a block diagram of a processor platform structured to execute the example machine readable instructions of FIG. 3-6 to implement the example resource allocation preference determiner of FIGS. 1 and/or 2.

FIG. 12 is a block diagram of an example processor platform 1200 capable of executing the instructions of FIG. 3-6 to implement the example resource allocation preference determiner 108 of FIGS. 1 and/or 2. The processor platform 1200 can be, for example, a server, a personal computer, a mobile device (e.g., a cell phone, a smart phone, a tablet such as an iPad'), a personal digital assistant (PDA), an Internet appliance, or any other type of computing device.

The processor platform 1200 of the illustrated example includes a processor 1212. The processor 1212 of the illustrated example is hardware. For example, the processor 1212 can be implemented by integrated circuits, logic circuits, microprocessors or controllers from any desired family or manufacturer.

The processor 1212 of the illustrated example includes a local memory 1213 (e.g., a cache). The example processor 1212 of FIG. 12 executes the instructions of FIG. 4-6 to implement the example STA component interface 200, the example RU index processor 202, the example packet generator 204, and/or the example STA condition analyzer 206 of FIG. 2 and/or the example application processor 810 of FIG. 8. The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a clock controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIGS. 3-6 may be stored in the mass storage device 1228, in the volatile memory 1214, in the non-volatile memory 1216, and/or on a removable tangible computer readable storage medium such as a CD or DVD.

Example 1 includes an apparatus to mitigate coexistence interference in a wireless network, the apparatus comprising a station component interface to receive an expected transmission power from an access point, an index processor to determine a set of preferred resource unit (ru) indexes from a set of available ru indexes for at least one of (a) uplink transmission to the access point based on a comparison of allowable transmission power and the expected transmission power or (b) downlink reception based on a comparison of a noise floor to a noise threshold, and the station component interface to transmit a message including the preferred ru indexes to the access point.

Example 2 includes the apparatus of example 1, further including a station condition analyzer to determine at least one of (a) the allowable transmission power of each of the available ru indexes or (b) the noise floor of each of the available ru indexes.

Example 3 includes the apparatus of example 1, wherein the index processor is to determine the set of preferred ru indexes based on whether the allowable transmission power satisfies the expected transmission power.

Example 4 includes the apparatus of example 1, further including a station condition analyzer to determine if a bandwidth requirement for transmission is satisfied.

Example 5 includes the apparatus of example 4, further including a packet generator to, when the station condition analyzer determines that the bandwidth requirement is not satisfied, generate an updated message including an expanded bandwidth of the preferred ru indexes, the station component interface to transmit the updated message to the access point.

Example 6 includes the apparatus of examples 1-5, wherein the index processor is to determine the set of preferred ru indexes from the set of available ru indexes for uplink transmission by, when the allowable transmission power is more than the expected transmission power, including an ru index in the set of preferred ru indexes for uplink transmission.

Example 7 includes the apparatus of examples 1-5, wherein the index processor is to determine the set of preferred ru indexes from the set of available ru indexes for downlink reception by, when the noise floor is less than the noise threshold, including an ru index in the set of preferred ru indexes for downlink reception.

Example 8 includes the apparatus of examples 1-5, further including a station condition analyzer to measure a data success rate corresponding to the preferred ru indexes for at least one of the uplink transmission or the downlink transmission, the index processor to when the data success rate is above a threshold, increase a range of the preferred ru indexes, and when the data success rate is below the threshold, decrease the range of the preferred ru indexes.

Example 9 includes a method to mitigate coexistence interference in a wireless network, the method comprising receiving, by executing an instruction using a processor, an expected transmission power from an access point, determining, by executing an instruction using the processor, a set of preferred resource unit (ru) indexes from a set of available ru indexes for at least one of (a) uplink transmission to the access point based on a comparison of allowable transmission power and the expected transmission power or (b) downlink reception based on a comparison of a noise floor to a noise threshold, and transmitting, by executing an instruction using the processor, a message including the preferred ru indexes to the access point.

Example 10 includes the method of example 9, further including a station condition analyzer to determine at least one of (a) the allowable transmission power of each of the available ru indexes or (b) the noise floor of each of the available ru indexes.

Example 11 includes the method of example 9, wherein the index processor is to determine the set of preferred ru indexes based on whether the allowable transmission power satisfies the expected transmission power.

Example 12 includes the method of example 9, further including determining if a bandwidth requirement for transmission is satisfied.

Example 13 includes the method of example 12, further including, when the bandwidth requirement is not satisfied, generating an updated message including an expanded bandwidth of the preferred ru indexes and transmitting the updated message to the access point.

Example 14 includes the method of examples 9-13, wherein the determining of the set of preferred ru indexes from the set of available ru indexes for uplink transmission includes, when the allowable transmission power is more than the expected transmission power, including an ru index in the set of preferred ru indexes for uplink transmission.

Example 15 includes the method of examples 9-13, wherein the determining of the set of preferred ru indexes from the set of available ru indexes for downlink reception includes, when the noise floor is less than the noise threshold, including an ru index in the set of preferred ru indexes for downlink reception.

Example 16 includes the method of examples 9-13, further including measuring a data success rate corresponding to the preferred ru indexes for at least one of the uplink transmission or the downlink transmission, when the data success rate is above a threshold, increase a range of the preferred ru indexes, and when the data success rate is below the threshold, decrease the range of the preferred ru indexes.

Example 17 includes a non-transitory computer readable storage medium including instructions which, when executed, cause a machine to at least receive an expected transmission power from an access point, determine a set of preferred resource unit (ru) indexes from a set of available ru indexes for at least one of (a) uplink transmission to the access point based on a comparison of allowable transmission power and the expected transmission power or (b) downlink reception based on a comparison of a noise floor to a noise threshold, and transmit a message including the preferred ru indexes to the access point.

Example 18 includes the computer readable storage medium of example 17, wherein the instructions cause the machine to determine at least one of (a) the allowable transmission power of each of the available ru indexes or (b) the noise floor of each of the available ru indexes.

Example 19 includes the computer readable storage medium of example 17, wherein the instructions cause the machine to determine the set of preferred ru indexes based on whether the allowable transmission power satisfies the expected transmission power.

Example 20 includes the computer readable storage medium of example 17, wherein the instructions cause the machine to determine if a bandwidth requirement for transmission is satisfied.

Example 21 includes the computer readable storage medium of example 20, wherein the instructions cause the machine to, when the bandwidth requirement is not satisfied, generate an updated message including an expanded bandwidth of the preferred ru indexes and transmit the updated message to the access point.

Example 22 includes the computer readable storage medium of examples 17-21, wherein the instructions cause the machine to determine the set of preferred ru indexes from the set of available ru indexes for uplink transmission by, when the allowable transmission power is more than the expected transmission power, including an ru index in the set of preferred ru indexes for uplink transmission.

Example 23 includes the computer readable storage medium of examples 17-21, wherein the instructions cause the machine to determine the set of preferred ru indexes from the set of available ru indexes for downlink reception by, when the noise floor is less than the noise threshold, including an ru index in the set of preferred ru indexes for downlink reception.

Example 24 includes the computer readable storage medium of examples 17-21, wherein the instructions cause the machine to measure a data success rate corresponding to the preferred ru indexes for at least one of the uplink transmission or the downlink transmission, when the data success rate is above a threshold, increase a range of the preferred ru indexes, and when the data success rate is below the threshold, decrease the range of the preferred ru indexes.

Example 25 includes an apparatus to mitigate coexistence interference in a wireless network, the apparatus comprising memory and processing circuitry, configured to interface to receive an expected transmission power from an access point, determine a set of preferred resource unit (ru) indexes from a set of available ru indexes for at least one of (a) uplink transmission to the access point based on a comparison of allowable transmission power and the expected transmission power or (b) downlink reception based on a comparison of a noise floor to a noise threshold, and transmit a message including the preferred ru indexes to the access point.

Example 26 includes the apparatus of example 25, wherein the memory and processing circuitry is configured to determine at least one of (a) the allowable transmission power of each of the available ru indexes or (b) the noise floor of each of the available ru indexes.

Example 27 includes the apparatus of example 25, wherein the memory and processing circuitry is configured to determine the set of preferred ru indexes based on whether the allowable transmission power satisfies the expected transmission power.

Example 28 includes the apparatus of example 25, wherein the memory and processing circuitry is configured to determine if a bandwidth requirement for transmission is satisfied.

Example 29 includes the apparatus of example 28, wherein the memory and processing circuitry is configured to, when the station condition analyzer determines that the bandwidth requirement is not satisfied, generate an updated message including an expanded bandwidth of the preferred ru indexes, the station component interface to transmit the updated message to the access point.

Example 30 includes the apparatus of example 25-29, wherein the memory and processing circuitry is configured to determine the set of preferred ru indexes from the set of available ru indexes for uplink transmission by, when the allowable transmission power is more than the expected transmission power, including an ru index in the set of preferred ru indexes for uplink transmission.

Example 31 includes the apparatus of example 25-29, wherein the memory and processing circuitry is configured to determine the set of preferred ru indexes from the set of available ru indexes for downlink reception by, when the noise floor is less than the noise threshold, including an ru index in the set of preferred ru indexes for downlink reception.

Example 32 includes the apparatus of example 25-29, wherein the memory and processing circuitry is configured to measure a data success rate corresponding to the preferred ru indexes for at least one of the uplink transmission or the downlink transmission, when the data success rate is above a threshold, increase a range of the preferred ru indexes, and when the data success rate is below the threshold, decrease the range of the preferred ru indexes.

Example 33 includes an apparatus to mitigate coexistence interference in a wireless network, the apparatus comprising a first means for receiving an expected transmission power from an access point, a second means for determining a set of preferred resource unit (ru) indexes from a set of available ru indexes for at least one of (a) uplink transmission to the access point based on a comparison of allowable transmission power and the expected transmission power or (b) downlink reception based on a comparison of a noise floor to a noise threshold, and the first means including means for transmitting a message including the preferred ru indexes to the access point.

Example 34 includes the apparatus of example 33, further including third means for determining at least one of (a) the allowable transmission power of each of the available ru indexes or (b) the noise floor of each of the available ru indexes.

Example 35 includes the apparatus of example 33, wherein the second means includes means for determining the set of preferred ru indexes based on whether the allowable transmission power satisfies the expected transmission power.

Example 36 includes the apparatus of example 33, further including third means for determining if a bandwidth requirement for transmission is satisfied.

Example 37 includes the apparatus of example 36, further including fourth means for, when the third means includes means for determining that the bandwidth requirement is not satisfied, generating an updated message including an expanded bandwidth of the preferred ru indexes, the first means including means for transmitting the updated message to the access point.

Example 38 includes the apparatus of example 33-37, wherein the second means includes means for determining the set of preferred ru indexes from the set of available ru indexes for uplink transmission by, when the allowable transmission power is more than the expected transmission power, including an ru index in the set of preferred ru indexes for uplink transmission.

Example 39 includes the apparatus of example 33-37, wherein the second means includes means for determining the set of preferred ru indexes from the set of available ru indexes for downlink reception by, when the noise floor is less than the noise threshold, including an ru index in the set of preferred ru indexes for downlink reception.

Example 40 includes the apparatus of example 33-37, further including third means for measuring a data success rate corresponding to the preferred ru indexes for at least one of the uplink transmission or the downlink transmission, the second means including means for when the data success rate is above a threshold, increasing a range of the preferred ru indexes, and when the data success rate is below the threshold, decreasing the range of the preferred ru indexes.

From the foregoing, it would be appreciated that the above disclosed method, apparatus, and articles of manufacture mitigate coexistence interference in a wireless network. Examples disclosed herein facilitate communication of a RAPR from a STA to an AP. The STA identifies preferred RU indexes for UL TX and/or DL RX for OFDMA communications based on expected noise floors and/or allowed TX power for coexistence. In this manner, overall throughput of LTE and WLAN traffic can be optimized while both are utilized concurrently.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus to mitigate coexistence interference in a wireless network, the apparatus comprising:
   a station component interface to receive an expected transmission power from an access point;
   an index processor to determine a set of preferred resource unit (RU) indexes from a set of available RU indexes for at least one of (A) uplink transmission to the access point based on a comparison of allowable transmission power and the expected transmission power or (B) downlink reception based on a comparison of a noise floor to a noise threshold; and
   the station component interface to transmit a message including the preferred RU indexes to the access point.

2. The apparatus of claim 1, further including a station condition analyzer to determine at least one of (A) the allowable transmission power of each of the available RU indexes or (B) the noise floor of each of the available RU indexes.

3. The apparatus of claim 1, wherein the index processor is to determine the set of preferred RU indexes based on whether the allowable transmission power satisfies the expected transmission power.

4. The apparatus of claim 1, further including a station condition analyzer to determine if a bandwidth requirement for transmission is satisfied.

5. The apparatus of claim 4, further including a packet generator to, when the station condition analyzer determines that the bandwidth requirement is not satisfied, generate an updated message including an expanded bandwidth of the preferred RU indexes, the station component interface to transmit the updated message to the access point.

6. The apparatus of claim 1, wherein the index processor is to determine the set of preferred RU indexes from the set of available RU indexes for uplink transmission by, when the allowable transmission power is more than the expected transmission power, including an RU index in the set of preferred RU indexes for uplink transmission.

7. The apparatus of claim 1, wherein the index processor is to determine the set of preferred RU indexes from the set of available RU indexes for downlink reception by, when the noise floor is less than the noise threshold, including an RU index in the set of preferred RU indexes for downlink reception.

8. The apparatus of claim 1, further including a station condition analyzer to measure a data success rate corresponding to the preferred RU indexes for at least one of the uplink transmission or the downlink transmission, the index processor to:
   when the data success rate is above a threshold, increase a range of the preferred RU indexes; and
   when the data success rate is below the threshold, decrease the range of the preferred RU indexes.

9. A method to mitigate coexistence interference in a wireless network, the method comprising:
   receiving, by executing an instruction using a processor, an expected transmission power from an access point;
   determining, by executing an instruction using the processor, a set of preferred resource unit (RU) indexes from a set of available RU indexes for at least one of (A) uplink transmission to the access point based on a comparison of allowable transmission power and the expected transmission power or (B) downlink reception based on a comparison of a noise floor to a noise threshold; and
   transmitting, by executing an instruction using the processor, a message including the preferred RU indexes to the access point.

10. The method of claim 9, further including determining at least one of (A) the allowable transmission power of each of the available RU indexes or (B) the noise floor of each of the available RU indexes.

11. The method of claim 9, further including determining the set of preferred RU indexes based on whether the allowable transmission power satisfies the expected transmission power.

12. The method of claim 9, further including determining if a bandwidth requirement for transmission is satisfied.

13. The method of claim 12, further including, when the bandwidth requirement is not satisfied, generating an updated message including an expanded bandwidth of the preferred RU indexes and transmitting the updated message to the access point.

14. The method of claim 9, wherein the determining of the set of preferred RU indexes from the set of available RU indexes for uplink transmission includes, when the allowable transmission power is more than the expected transmission power, including an RU index in the set of preferred RU indexes for uplink transmission.

15. The method of claim 9, wherein the determining of the set of preferred RU indexes from the set of available RU indexes for downlink reception includes, when the noise floor is less than the noise threshold, including an RU index in the set of preferred RU indexes for downlink reception.

16. The method of claim 9, further including:
   measuring a data success rate corresponding to the preferred RU indexes for at least one of the uplink transmission or the downlink transmission;
   when the data success rate is above a threshold, increasing a range of the preferred RU indexes; and
   when the data success rate is below the threshold, decreasing the range of the preferred RU indexes.

17. A non-transitory computer readable storage medium including instructions which, when executed, cause a machine to at least:
   receive an expected transmission power from an access point;
   determine a set of preferred resource unit (RU) indexes from a set of available RU indexes for at least one of (A) uplink transmission to the access point based on a comparison of allowable transmission power and the expected transmission power or (B) downlink reception based on a comparison of a noise floor to a noise threshold; and
   transmit a message including the preferred RU indexes to the access point.

18. The computer readable storage medium of claim 17, wherein the instructions cause the machine to determine at least one of (A) the allowable transmission power of each of the available RU indexes or (B) the noise floor of each of the available RU indexes.

19. The computer readable storage medium of claim 17, wherein the instructions cause the machine to determine the set of preferred RU indexes based on whether the allowable transmission power satisfies the expected transmission power.

20. The computer readable storage medium of claim 17, wherein the instructions cause the machine to determine if a bandwidth requirement for transmission is satisfied.

21. The computer readable storage medium of claim 20, wherein the instructions cause the machine to, when the bandwidth requirement is not satisfied, generate an updated message including an expanded bandwidth of the preferred RU indexes and transmit the updated message to the access point.

22. The computer readable storage mediums of claim 17, wherein the instructions cause the machine to determine the set of preferred RU indexes from the set of available RU indexes for uplink transmission by, when the allowable transmission power is more than the expected transmission power, including an RU index in the set of preferred RU indexes for uplink transmission.

23. The computer readable storage medium of claim 17, wherein the instructions cause the machine to determine the set of preferred RU indexes from the set of available RU indexes for downlink reception by, when the noise floor is less than the noise threshold, including an RU index in the set of preferred RU indexes for downlink reception.

24. The computer readable storage medium of claim 17, wherein the instructions cause the machine to:
  measure a data success rate corresponding to the preferred RU indexes for at least one of the uplink transmission or the downlink transmission;
  when the data success rate is above a threshold, increase a range of the preferred RU indexes; and
  when the data success rate is below the threshold, decrease the range of the preferred RU indexes.

\* \* \* \* \*